US011665410B2

(12) United States Patent
Rodriguez et al.

(10) Patent No.: US 11,665,410 B2
(45) Date of Patent: May 30, 2023

(54) MODULAR VISION SYSTEMS AND METHODS

(71) Applicant: COGNEX CORPORATION, Natick, MA (US)

(72) Inventors: Saul Sanz Rodriguez, Aachen (DE); Jens Ruetten, Aachen (DE); Laurens Nunnink, Simpelveld (NL)

(73) Assignee: COGNEX CORPORATION, Natick, MA (US)

( * ) Notice: Subject to any disclaimer, the term of this patent is extended or adjusted under 35 U.S.C. 154(b) by 8 days.

(21) Appl. No.: 17/195,396

(22) Filed: Mar. 8, 2021

(65) Prior Publication Data

US 2021/0289114 A1  Sep. 16, 2021

Related U.S. Application Data

(63) Continuation-in-part of application No. 16/814,378, filed on Mar. 10, 2020, now Pat. No. 11,281,868.

(51) Int. Cl.
*H04N 5/225* (2006.01)
*H04N 23/45* (2023.01)
(Continued)

(52) U.S. Cl.
CPC ............ *H04N 23/45* (2023.01); *H04N 23/51* (2023.01); *H04N 23/54* (2023.01); *H04N 23/55* (2023.01); *H04N 23/695* (2023.01)

(58) Field of Classification Search
CPC .. H04N 5/2258; H04N 5/2252; H04N 5/2253; H04N 5/2254; H04N 5/23299;
(Continued)

(56) References Cited

U.S. PATENT DOCUMENTS 5,600,116 A  2/1997  Seo et al.
7,219,843 B2  5/2007  Havens et al.
(Continued)

FOREIGN PATENT DOCUMENTS

EP  1492357 A2  12/2004
JP  H03138634 A  6/1991
(Continued)

OTHER PUBLICATIONS

Banggood, Caddx Tarsier V2 4K 30fps 1200TVL Double Lens Super WDR WiFi Mini FPV Camera HD Recording DVR Dual Audio OSD for RC Racing Drone, https://www.banggood.com/de/Caddx-Tarsier-4K-30fps-1200TVL-Dual-Lens-Super-WDR-WiFi-Mini-FPV-Camera-HD-Recording-DVR-Dual-Audio-OSD-for-RC-Racing-Drone-p-1467840.html, Copyright 2006-2021 Banggood, 15 pages.
(Continued)

*Primary Examiner* — Seung H Lee
(74) *Attorney, Agent, or Firm* — Quarles & Brady LLP

(57) ABSTRACT

A modular vision system that can include a housing with a faceplate and a first and second optical module mounted to the faceplate. Each of the first and second optical modules can include a mounting body, a rectangular image sensor, and an imaging lens that defines an optical axis and a field of view. The first optical module can be configured to be mounted to the faceplate in a first plurality of mounting orientations and the second optical module can be configured to be mounted to the faceplate in a second plurality of mounting orientations. The first and second optical modules can thus collectively provide a plurality of imaging configurations.

17 Claims, 15 Drawing Sheets

(51) Int. Cl.
*H04N 23/51* (2023.01)
*H04N 23/54* (2023.01)
*H04N 23/55* (2023.01)
*H04N 23/695* (2023.01)

(58) Field of Classification Search
CPC ...... H04N 5/247; G06K 7/1098; G06K 19/06; G06K 7/10; G02B 7/022; G02B 7/003; G03B 17/12; B25J 9/16
See application file for complete search history.

(56) References Cited

U.S. PATENT DOCUMENTS

| | | | |
|---|---|---|---|
| 9,082,034 | B2 | 7/2015 | Lei et al. |
| 9,182,356 | B2 | 11/2015 | Nagoshi |
| 9,819,863 | B2 | 11/2017 | Osborne et al. |
| 9,979,933 | B1 | 5/2018 | Nunnink et al. |
| 10,389,925 | B2 | 8/2019 | Kim et al. |
| 10,502,925 | B2 | 12/2019 | Mistkawi |
| 10,817,687 | B2 | 10/2020 | Tan et al. |
| 11,350,020 | B2 * | 5/2022 | Tanaka ............... G02B 27/0012 |
| 2005/0103858 | A1 | 5/2005 | Zhu et al. |
| 2006/0043187 | A1 | 3/2006 | He et al. |
| 2010/0176319 | A1 | 7/2010 | Nunnink et al. |
| 2013/0235261 | A1 | 9/2013 | Berkner et al. |
| 2014/0118516 | A1 | 5/2014 | Suzuki et al. |
| 2016/0188936 | A1 | 6/2016 | Nunnink et al. |
| 2021/0250472 | A1* | 8/2021 | Liu ..................... G03B 17/561 |

FOREIGN PATENT DOCUMENTS

| | | |
|---|---|---|
| JP | H08205200 A | 8/1996 |
| JP | 2006270265 A | 10/2006 |
| JP | 2010217410 A | 9/2010 |

OTHER PUBLICATIONS

Cognex, Datasheet: DataMan 150/260 Series Barcode Readers, Copyright 2017 Cognex Corporation, 6 pages.
European Patent Office, Extended Search Report, Application No. 21161772.5, dated Jun. 30, 2021, 9 pages.
Japan Patent Office, Notification of Reasons for Refusal, Application No. 2021-038398, dated Oct. 4, 2022, 5 pages.

* cited by examiner

MODULAR VISION SYSTEMS AND METHODS

RELATED APPLICATIONS

This application is a continuation-in-part application and claims priority to pending U.S. application Ser. No. 16/814,378, filed Mar. 10, 2020 and titled "Modular Vision System and Methods," which is incorporated herein by reference.

STATEMENT REGARDING FEDERALLY SPONSORED RESEARCH OR DEVELOPMENT

Not applicable.

BACKGROUND

The present technology relates to vision systems, for example, bar code readers.

SUMMARY OF THE TECHNOLOGY

Generally, embodiments of the technology can provide interchangeable modules and associated mounting systems for machine vision systems. For example, each modules of a plurality of interchangeable modules can exhibit a similar mounting structures for attachment to an imaging device, but can support a different type or arrangement of optical device. Thus, when used in combination with a compatible support structure (e.g., a faceplate of an imaging device with complementary mounting apertures), some embodiments can allow quick and easy transitions between different optical devices for different types of operations.

The technology can include a modular sensor system including a housing, a faceplate removably mountable to the housing, a first squared modular mounting body, and a second first squared modular mounting body. The faceplate can have a first squared mounting aperture and a second squared mounting aperture. The first squared modular mounting body can support a first optical device, and the second squared modular mounting body can support a second optical device. Each of the first and second mounting bodies can be separately removably securable within either of the first of second squared mounting apertures in either of a first orientation or a second orientation.

The first and second mounting bodies of the modular sensor system can include a square front flange that is configured to seat on a recessed shoulder of the first or second mounting apertures of the faceplate.

The faceplate of the modular sensor system can be securable to the housing in either of a first rotational orientation or a second rotational orientation. A squared mounting portion of each of the first or second mounting apertures can be aligned perpendicularly relative to an imaging axis of the housing when the faceplate is in the first rotational orientation and is aligned parallel relative to the imaging axis of the housing when the faceplate is in the second rotational orientation.

The first optical device of the modular sensor system can include a first imaging sensor with an elongated rectangular shape and the second optical device of the modular sensor system can include a second imaging sensor with an elongated rectangular shape. The long dimensions of the first and second imaging sensors can be oriented parallel to each other when the first and second squared modular mounting bodies are both installed in the respective first orientation. The long dimensions of the first and second imaging sensors can be oriented perpendicular to each other when the first squared modular mounting body is installed in the first orientation and the second squared modular mounting body is installed in the second orientation.

The first optical device of the modular sensor system can have a first lens mount configured to receive a first lens of a first mounting type and the second optical device can have a second lens mount configured to receive a second lens of a second mounting type.

The faceplate of the modular sensor system can have a first I/O port adjacent the first mounting aperture and a second I/O port adjacent the second mounting aperture.

The modular sensor system can further include a position indicator configured to indicate an installed position of either of the first or second optical devices on the faceplate.

The modular sensor system can further include a machine vision computing device within the housing. The machine vision computing device can be in electrical communication with the first optical device and the second optical device over a flexible PCB connector.

The technology can include a modular sensor system including a faceplate having a first mounting aperture and a second mounting aperture, a first optical module that can include a first optical device secured to a first mounting body, and a second optical module that can include a second optical device secured to a second mounting body. The first mounting body can be selectively securable within either the first mounting aperture or the second mounting aperture, in a first plurality of rotationally distinct orientations, for operation of the first optical device. The second mounting body can be selectively securable within either the first mounting aperture or the second mounting aperture, in a second plurality of rotationally distinct orientations, for operation of the first optical device.

The first mounting aperture, the second mounting aperture, the first mounting body, and the second mounting body of the modular sensor system can include a respective polygonal mounting portion. Each of the respective polygonal mounting portions can include a respective set of squared mounting portions. The squared mounting portions of each of the first and second mounting apertures can be configured to engage the squared mounting portions of either of the first or the second optical modules with the first and second optical modules in either of at least two of the rotationally distinct orientations.

The faceplate of the modular sensing body can be configured to mount to a housing of a machine vision device in either of a first orientation or a second orientation. A rotational difference between the first orientation of the faceplate and the second orientation of the faceplate can be 90 degrees.

The first optical module of the modular sensing body can be configured to removably receive and electrically communicate with a lens.

The technology can include a modular sensor system for a machine vision system that includes a faceplate with a first mounting aperture and a second mounting aperture. Each optical module of a plurality of optical modules can include a mounting body and at least one of an optical device or a lens mount. A first-side mounting portion and a second-side mounting portion of each of the mounting bodies can be configured to engage either of a first-side mounting portion or a second-side mounting portion of either of the first or second mounting apertures to secure the respective mounting body to the faceplate and against rotation relative to the respective first or second mounting aperture with the respective mounting body in any of a plurality of mounting orientations.

The mounting portions of each of the mounting bodies of the modular sensor system can be configured to engage the mounting portions of each of the faceplate mounting apertures to selectively secure the respective mounting body against rotation with the respective mounting body at either of a first or a second rotational orientation. A rotational difference between the first and second rotational orientations can be 90 degrees.

The first-side and second-side mounting portions of each of the optical modules of the modular sensor system can include squared rotationally-symmetric peripheral walls.

The first-side and second-side mounting structures of each of the mounting bodies of the modular sensor system can collectively define a rectangular mounting structure.

The technology can include a modular vision system that includes a housing with a faceplate, a first optical module that is mounted to the faceplate, and a second optical module that is mounted to the faceplate. The first optical module can include a first mounting body, a first rectangular image sensor, and a first imaging lens that defines a first optical axis and a first field of view (FOV). The second optical module can include a second mounting body, a second rectangular image sensor, and a second imaging lens that defines a second optical axis and a second field of view (FOV). The first optical module can be configured to be mounted to the faceplate in a first plurality of mounting orientations and the second optical module can be configured to be mounted to the faceplate in a second plurality of mounting orientations. A plurality of imaging configurations can be collectively provided in which the first and second optical axes extend obliquely relative to each other within a common plane. In some cases, additionally, first sides of the first rectangular image sensor can be parallel to second sides of the second rectangular image sensor in the plurality of imaging configurations.

Each of two or more of the imaging configurations of the modular vision system can correspond to a respective different angle defined between the first and second optical axes.

A first direction in which the first optical axis extends from the first optical module of the modular vision system can diverge from a second direction in which the second optical axis extends from the second optical module of the modular vision system, in two or more of the imaging configurations. The angle defined between the first and second optical axes can be between 5° and 30°, inclusive, in the two or more of the imaging configurations.

The modular vision system can further include a first interchangeable wedge configured to provide a subset of the first plurality of mounting orientations and a second interchangeable wedge configured to provide a subset of the second plurality of mounting orientations.

The modular vision system can further include a first cylindrical mounting surface configured to support the first optical module relative to the housing in the first plurality of mounting orientations and a second cylindrical mounting surface configured to support the second optical module relative to the housing in the second plurality of mounting orientations.

In at least one of the imaging configurations of the modular vision system, the first optical axis can extend from the first optical module towards the second optical axis and the second optical axis can extend from the second optical module towards the first optical axis. In the at least one of the imaging configurations, the first and second optical axes can be aligned relative to each other to provide an overlap of constant width between the first and second FOVs within the common plane. In the at least one of the imaging configurations, a side of the first FOV that is farthest from the second optical module and a side of the second FOV that is farthest from the first optical module can extend in parallel with an imaging direction.

The technology can include a modular vision system including a housing with a faceplate, a first optical module that is mounted to the faceplate, and a second optical module that is mounted to the faceplate. The first optical module can include a first mounting body, a first rectangular image sensor, and a first imaging lens that defines a first optical axis and a first FOV. The second optical module can include a second mounting body, a second rectangular image sensor, and a second imaging lens that defines a second optical axis and a second FOV. The second optical axis can be in a common plane with the first optical axis, and an optical element axis can define a direction that extends between the first and second optical axes The first optical module can be configured to be mounted to the faceplate in a first plurality of mounting orientations and the second optical module can be configured to be mounted to the faceplate in a second plurality of mounting orientations. A plurality of imaging configurations can be collectively provided in which the first optical axis can be laterally offset relative to a center of the first rectangular image sensor, in the direction of the optical axis, by a plurality of different distances, and the second optical axis can be laterally offset from a center of the second rectangular image sensor, in the direction of the optical element axis, by a plurality of different distances. In some cases, additionally, first sides of the first rectangular image sensor can be parallel to second sides of the second rectangular image sensor in the plurality of imaging configurations.

Each of two or more of the imaging configurations of the modular vision system can correspond to a respective different set of the offsets of the first and second optical axes from the centers of the first and second rectangular image sensors.

The first and second optical axes of the modular vision system can be parallel with each other in the plurality of imaging configurations. In at least one of the imaging configurations, the offsets of the first and second optical axes can provide an overlap of constant width between the first and second FOVs within a common plane.

In the at least one of the imaging configurations, the offset of the first optical axis can be an outward offset that aligns the first optical axis to intersect an outer edge of the first rectangular image sensor and the offset of the second optical axis can be an outward offset that aligns the second optical axis to intersect an outer edge of the second rectangular image sensor.

The first imaging lens of the modular vision system can be a first variable focal length lens and the second imaging lens of the modular vision system can be a second variable focal length lens. In the at least one of the imaging configurations, adjustment of the first and second imaging lenses to any of a plurality of common focal lengths can provide an overlap of constant width between the first and second FOVs, within a common plane, at working distances corresponding to the common focal lengths.

The technology can include a modular vision system including a housing with a faceplate, a first optical module that is mounted to the faceplate, and a second optical module that is mounted to the faceplate. The first optical module can include a first mounting body, a first rectangular image sensor, and a first imaging lens that defines a first optical axis and a first FOV. The second optical module can include a second mounting body, a second rectangular image sensor, and a second imaging lens that defines a second optical axis and a second FOV. The first optical module can be configured to be mounted to the faceplate in a first plurality of mounting orientations and the second optical module can be configured to be mounted to the faceplate in a second plurality of mounting orientations, to selectively place the modular vision system in a plurality of imaging configurations that provide a plurality of distinct configurations of the first and second optical axes.

In each of two or more of the mounting orientations, the first and second optical axes of the modular vision system can angle away from each other within a common plane. In each of two or more of the mounting orientations, the first and second optical axes can angle towards each other and provide an overlap of constant width between the first and second FOVs within a common plane.

In a first and a second of the mounting orientations, the first optical axis of the modular vision system can extend in parallel with the second optical axis, within a common plane. The first mounting orientation can provide a first offset configuration of the first and second optical axes relative to the corresponding first or second image sensor. The second mounting orientation can provide a second, different offset configuration of the first and second optical axes relative to the corresponding first or second image sensor. The first imaging lens can be a first variable focal length lens and the second imaging lens can be a second variable focal length lens. In the first imaging configuration, adjustment of the first and second imaging lenses to any of a plurality of first common focal lengths can provide an overlap of a first constant width between the first and second FOVs, within the common plane, at the focus distances corresponding to the second common focal lengths. In the second imaging configuration, adjustment of the first and second imaging lenses to any of a plurality of second common focal lengths can provide an overlap of a second constant width between the first and second FOVs, within the common plane, at the focus distances corresponding to the second common focal lengths.

The technology can include a method of configuration a modular vision system. The method can include mounting a first optical module to a housing of the modular vision system, the first optical module including a first mounting body, a first rectangular image sensor, and a first imaging lens that defines a first optical axis and a first FOV; and mounting a second optical module to the housing, the second optical module including a second mounting body, a second rectangular image sensor, and a second imaging lens that defines a second optical axis and a second FOV. Mounting the first and second optical modules can include, to collectively provide a select imaging configuration of a plurality of imaging configurations in which the first and second optical axes extend obliquely relative to each other within a common plane: selecting, for the first optical module, among a first plurality of mounting orientations; and selecting, for the second optical module, among a second plurality of mounting orientations.

Each of two or more of the imaging configurations of the method can correspond to a respective different angle defined between the first and second optical axes.

A first direction in which the first optical axis extends from the first optical module in the method can diverge from a second direction in which the second optical axis extends from the second optical module, in two or more of the imaging configurations. An angle defined between the first and second optical axes can be between 10° and 30°, inclusive, in the two or more of the imaging configurations.

Mounting the first optical module to the housing in the method can include mounting a first interchangeable wedge configured to provide a subset of the first plurality of mounting orientations. Mounting the second optical module to the housing can include mounting a second interchangeable wedge configured to provide a subset of the second plurality of mounting orientations.

Mounting the first optical module to the housing in the method can include supporting the first optical module on a first cylindrical mounting surface. Mounting the second optical module to the housing can include supporting the second optical module on a second cylindrical mounting surface.

In at least one of the imaging configurations of the method, the first optical axis can extend from the first optical module towards the second optical axis and the second optical axis can extend from the second optical module towards the first optical axis. In the at least one of the imaging configurations of the method, the first and second optical axes can be aligned relative to each other to provide an overlap of constant width between the first and second FOVs within the common plane. In the at least one of the imaging configurations, an edge of the first FOV that is farthest from the second optical module can extend perpendicularly relative to an imaging plane of the first rectangular image sensor. An edge of the second FOV that is farthest from the first optical module can extend perpendicularly relative to an imaging plane of the second rectangular image sensor.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

Figure 1:
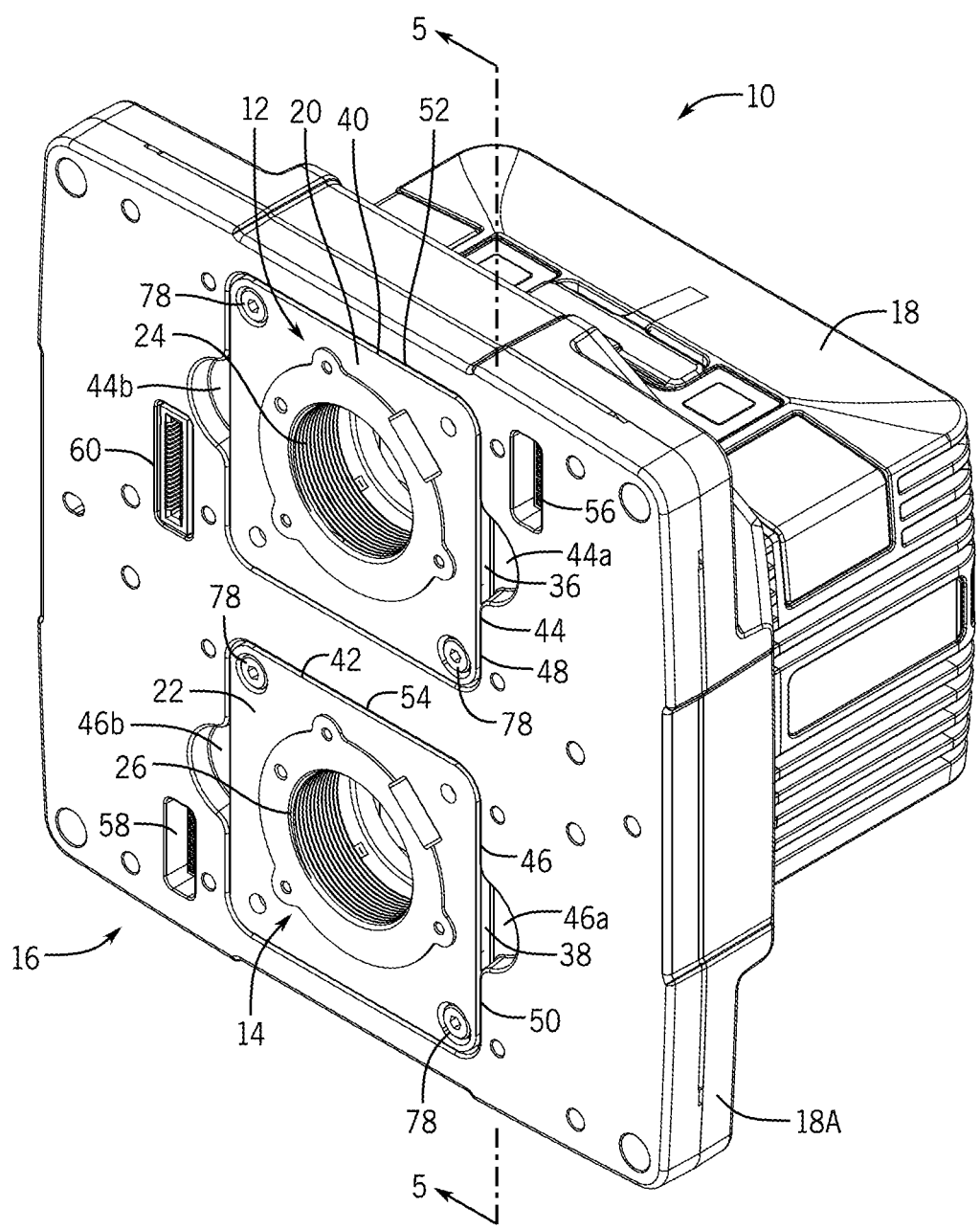
FIG. 1 is an isometric view of an machine vision system with a faceplate and a set of interchangeable optical modules in accordance with some embodiments of the technology.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

Unless otherwise specified or limited, the terms "connected," "mounted," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, unless otherwise defined or limited, directional terms are used for convenience of reference for discussion of particular figures or examples, not to indicate unchangeable absolute or relative orientations. For example, references to vertical or horizontal orientations may be used to discuss aspects of a particular example or figure, but do not necessarily require similar orientation or geometry in all installations or configurations. In this regard, however, "lateral" is generally used to indicate a direction that is at least partly perpendicular to a relevant reference frame (e.g., a general imaging direction, a reference line that is perpendicular to a face plate of an imaging device, a reference line that is perpendicular to an imaging sensor, etc.)

Various embodiments of the disclosed modular vision system are described herein in connection with a machine vision system including an electronic machine vision device and associated processing devices. That is because the features and advantages of the disclosure are well suited for this purpose. Still, it should be appreciated that the various aspects of the disclosure can be applied in the context of other types of systems, including machine vision systems other than those specifically discussed herein (e.g., handheld or fixed-mount imaging systems) and any other system that may benefit from a modular configuration.

Machine vision systems generally include one or more imaging devices and one or more processing devices (e.g., machine vision "engines") that are configured to automatically analyze certain aspects of acquired images. As such, machine vision systems can be used in manufacturing, assembly, test, measurement, automation, and control applications, among others, as non-limiting examples.

Generally, different configurations of machine vision systems, such as with different orientations or types of imaging sensors, different imaging lenses, or other optical modules (e.g., aimers, distance finders, etc.) may be needed to optimally perform specific machine vision tasks. For example, as noted above, machine vision systems can be configured to capture images of an object, analyze the images to identify relevant characteristics, actions, and so on, and instruct various devices (e.g., manufacturing or sorting devices) based upon the image analysis. In this context, an optimal type or orientation of an imaging sensor or an optimal type of lens or other optical device may be directly linked to the relative orientation of an object to be captured, the particular type of object or environment (e.g., relative to lighting considerations) or other factors. Accordingly, it may be useful for operators to be able to easily swap particular imaging sensors, lenses, or other optical devices for use with a particular machine vision system.

Some conventional imaging systems can be configured for capturing a specific object or for performing predetermined processes under particular conditions, with optical devices that are fixed in limited, predetermined and sometimes non-changeable orientations. Correspondingly, some conventional machine vision systems may be generally equipped to receive and operate with only a single (and single type of) optical device at any given time. Further, while some conventional systems can allow switching of optical devices, such as via the interexchange of lenses with similar mounting configurations, these systems may be not be particularly adaptable to accommodate wide varieties of operations and operating conditions.

Embodiments of the technology can address these or other issues, including by providing optical modules that are adapted for ready interchange for individual or collective use with a particular machine vision system. For example, in some embodiments of the technology, a plurality of optical modules can include similar mounting structures but different optical devices or other operative portions, allowing the optical modules to be readily exchanged for each other for use with a particular machine vision system. In some embodiments, a machine vision system can include a faceplate that is securable (e.g., removably securable) to a housing and capable of being reinstalled onto the housing in another, discrete orientation, as may allow optical modules secured to the faceplate to be similarly reoriented relative to other components of the system. In some embodiments, a faceplate can include one or more (e.g., multiple) mounting apertures within each of which any one of a set of interchangeable optical modules can be received. In some embodiments, an optical module can be configured to be removably received within a faceplate of a machine vision system for operation in more than one orientation. In some embodiments, such optical modules can be configured to receive different types of lenses (e.g., via different types of lens mounts), imaging sensors, or imaging accessories.

In some embodiments, an optical module and a corresponding mounting aperture can have generally complementary geometry that is configured to allow the optical module to be secured in a plurality of different rotational orientations. In some embodiments, such geometry may be configured in order to provide a discrete number of rotational orientations, to allow for easy alignment of an optical module with a particular orientation (e.g., relative to another machine vision component), or to provide other benefits. For example, some optical modules and mounting apertures can exhibit complementary squared mounting profiles, with respective sets of mounting portions (e.g. mounting faces or edges) that extend at right angles relative to each other.

As used herein, unless otherwise specified or limited, "squared" refers to a geometry that includes at least two segments that collectively form at least two sides of a square (i.e., equal-sided rectangular) profile. As such, for example, a squared optical module can include a set of at least two perpendicular mounting portions (e.g., linear mounting edges) that collectively define a part of a square. In some embodiments, this configuration for an optical module, in combination with a similar configuration for a mounting aperture, can usefully provide operators with a discrete set of rotationally distinct mounting orientations for the optical module, along with relatively secure mounting interfaces (e.g., between aligned sets of mounting portions (e.g., mounting edges) of the module and the aperture. Further, the different mounting orientations for this configuration and others (e.g., other polygonal mounting portions) can be easily visually or tactilely identifiable by operators, and can also appropriately align with typically desired changes in orientations for different machine vision applications.

Although squared arrangements may be particularly useful in some arrangements, including for the examples reasons outlined above, other configurations are also possible. For example, some modules or mounting apertures according to the disclosed technology may form non-squared parts of polygonal (e.g., hexagonal) profiles, or otherwise deviate in part or in whole from a squared profile.

Figure 2:
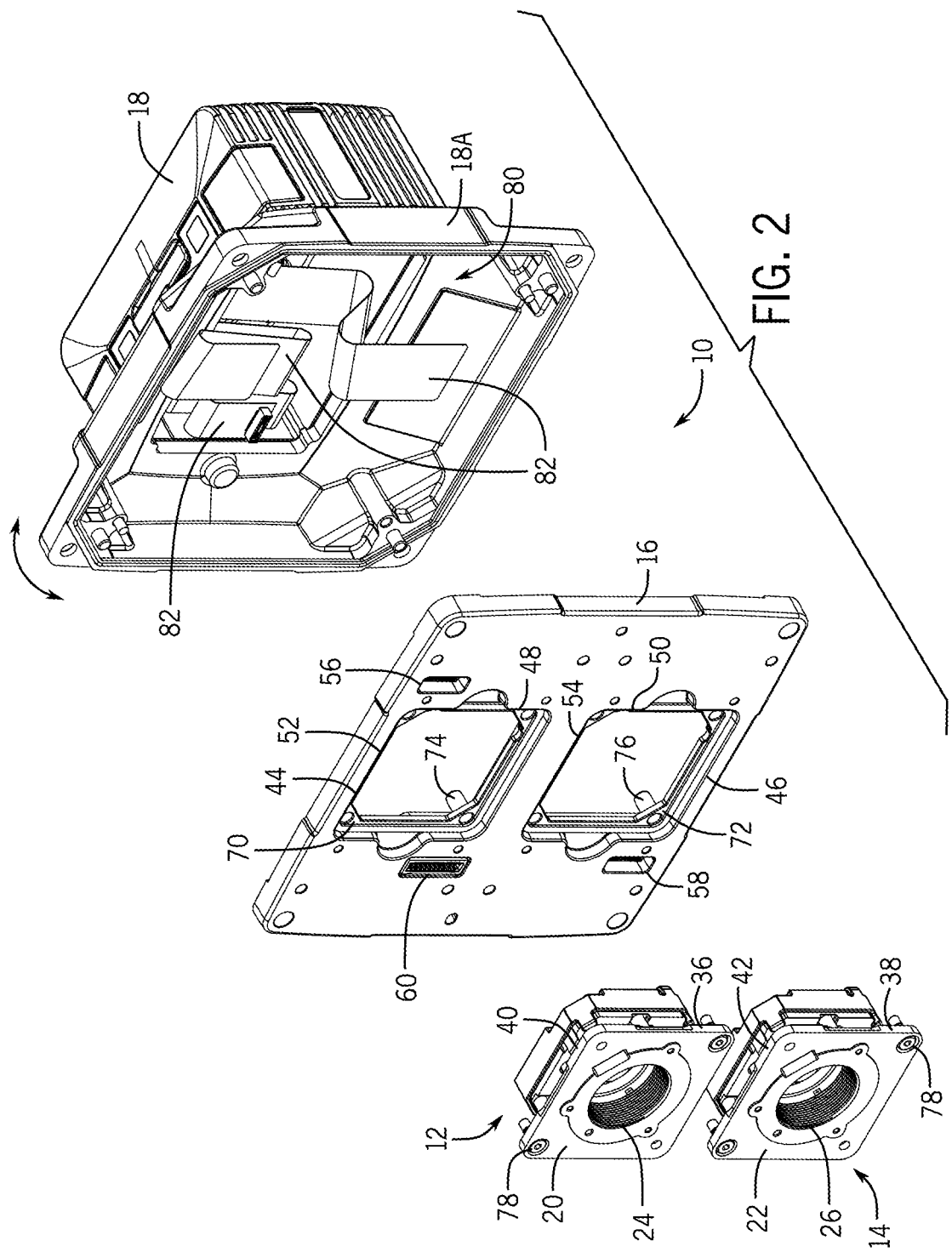
FIG. 2 is an isometric exploded top right front view of the machine vision system of FIG. 1.
Figure 3:
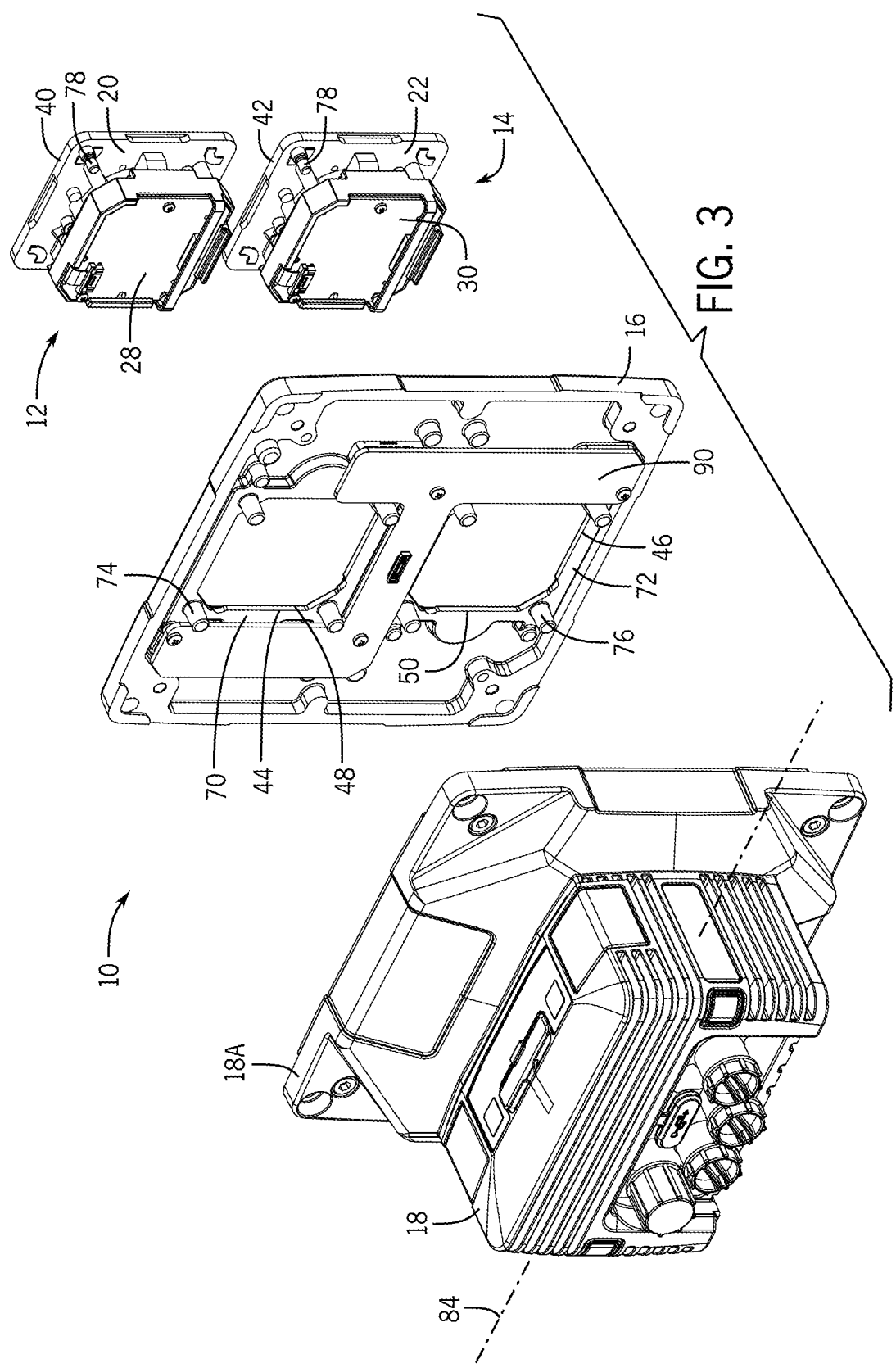
FIG. 3 is an isometric exploded top left rear view of the machine vision system of FIG. 1.

FIGS. 1-3 illustrate an example machine vision system 10 configured as an imaging device that is adapted to acquire and analyze one or more images of an object containing a machine readable symbol. The machine vision system 10 can use image acquisition software operable to perform any of various types of image acquisitions and analysis. For example, a conveyor transporting objects along a conveyor path causes relative movement between the objects and a field of view (FOV) of the machine vision system 10. Accordingly, as the conveyor operates, the machine vision system 10 can capture successive images of the objects (or other subjects) and then analyze (e.g., identify and decode) one or more symbols included in one or more of the images. In other embodiments, image acquisition for other objects or other machine-vision operations can also (or alternatively) be executed. Further, in some embodiments, the machine vision system 10 (or others according to this disclosure) can be used to image objects not on conveyors, can be operated as movable or handheld devices, and so on.

The machine vision system 10 includes a set of first and second optical modules 12, 14 removably and interchangeably received within a faceplate 16. In the illustrated embodiment, the faceplate 16 is removably attached to a housing 18, although other configurations are possible. For example, in some embodiments a housing bezel 18A of the housing 18 can be removed from the housing 18, rotated, and reattached to the housing 18 in a different orientation (see, e.g., rotation arrow in FIG. 2). In some embodiments, the interface between the housing 18 and the housing bezel 18A can be a square-shaped interface to allow rotation of the housing bezel 18 in approximately 90-degree increments relative to the housing 18.

The first and second optical modules 12, 14 are shown and described herein as a first optical module 12 and a second optical module 14. However, more or fewer modules can be provided. As further discussed below, the modular configuration of the optical modules 12, 14, in combination with corresponding construction of mounting apertures in the faceplate 16, can allow the machine vision system 10 to be easily customized to a wide variety of applications that may use a wide variety of optical devices alone or in various combinations.

In the illustrated embodiment, as shown in FIGS. 2 and 3 in particular, each of the first and second optical modules 12, 14 have a mounting body 20, 22, a lens mount 24, 26 (e.g., for s-mount or c-mount lens types), and an optical device. As one example, the optical devices shown and described for the first and second optical modules 12, 14 are configured as a first and second imaging sensors 32, 34 mounted to printed circuit boards (PCBs) 28, 30. However, other optical devices such as a distance sensor or measurement device (e.g., time-of-flight sensor, triangulation device, or other 3D sensor), an optical aiming device (e.g., for pattern projection), a lens assembly or a lens mount (e.g., for s-mount or c-mount lens types, etc.). In some embodiments, other devices can additionally (or alternatively) be included, such as an accelerometer or other orientation sensors.

In different embodiments, a mounting body of a module can exhibit a variety of different mounting portions (e.g., edges of mounting flanges) that facilitate attachment to a relevant machine vision (or other) system, including for attachment in multiple discrete orientations. For example, the mounting bodies 20, 22 are configured with squared mounting profiles, including squared first-side mounting portions 36, 38 and squared second-side mounting portions 40, 42 that extend at right angles relative to each other. In particular, mounting profiles of the mounting bodies 20, 22

(and the mounting bodies 20, 22 as a whole) are substantially square in shape, with the first-side mounting portions 36, 38 being linear and perpendicular to the second-side mounting portions 40, 42, which is also linear, and with additional mounting profiles symmetrically opposing each of the mounting portions 36, 38, 40, 42. (As used herein, "substantially square" indicates profiles that can include right-angle corners or rounded corners.) In other embodiments, however, other configurations are possible, such as configurations with two squared sides (e.g., similar to the mounting portions 36, 40) and two or more non-squared sides.

In the illustrated embodiment, the first-side mounting portions 36, 38 and the second-side mounting portions 40, 42 extend along the entirety of the respective side of the mounting bodies 20, 22. In other embodiments, a side mounting portion of a mounting profile may extend only partly along a relevant side of a module. Further, as also noted to above, some side mounting portions may be provided at an orientation other than perpendicular from other side mounting portions. For example, some mounting profiles may exhibit non-rectangular polygonal geometries, such that side mounting portions of the mounting profiles may extend relative to each other at a variety of different angles.

Generally, it may be useful for a mounting profile (and mounting portions thereof) to exhibit some degree of rotational symmetry, so that the associated module can be readily secured within a particular mounting aperture in a variety of rotational orientations. In some embodiments, mounting profiles with discrete rotational symmetry may be particularly useful, in order to provide a discrete number of potential installation orientations. As further discussed below, for example, the tetrad rotational symmetry of the mounting portions 36, 38, 40, 42 can allow the first and second optical modules 12, 14 to be secured at any of four discrete rotational orientations within the faceplate 16. In other embodiments, other types of rotational symmetry are also possible (e.g., for mounting profiles with a hexagonal or other polygonal shape, or other n-fold (CO rotationally symmetric profiles).

As stated above, the illustrated optical device for the first and second optical modules 12, 14 are first and second imaging sensors 32, 34. However, other optical devices such as, but not limited to, distance sensors, measurement systems or devices (e.g., time-of-flight, triangulation device, etc.), or optical aiming devices (e.g., for pattern projection) are also considered. In some embodiments, processor devices on a module (e.g., on the PCBs 28, 30) can be encoded with or otherwise configured to execute particular functionality, including relative to acquisition of images, targeting for image acquisition, distance measurements, and so on. In some embodiments, as also discussed below, an optical module can be configured for electronic communication with another device for execution of these or other functions. For example, the housing 18 includes a compartment 80 that houses a computing device 88 that can be programmed for execution of any variety of machine-vision (or other) functionality.

To facilitate communication with non-module computing devices, a variety of electronic connectors for modules can be provided. For example, a flexible PCB connector 82 can be selectively electronically connected to each of the first and second optical modules 12, 14, for transmission of data to or from the computing device 88 in the housing 18. In some embodiments, a flexible PCB connector can include a set of flexible PCBs that can couple one or more rigid PCBs together (for example rigid PCB 90 shown in FIG. 3). In some embodiments, a combination of rigid and flexible PCB connectors can be coupled together to provide flexibility and structure. In some embodiments, the flexible PCB connector 82 can include a hybrid rigid-flex PCB. Generally, a rigid-flex PCB has both rigid and flexible substrates that are laminated together into a single structure. Another form of PCB that can be used is a rigidized flex construction PCB, in which flex circuits include stiffeners attached to provide support for the electronic components on the circuit board. In some embodiments, other communication channels, including for wireless communications, are also contemplated.

The machine vision system 10 can also include a memory medium (shown here as configured to be a removable SD card receivable within an SD card slot in the housing 18). The memory medium can be used for storing scanned or processed images, buffering data and communications, storing computer-implemented instructions, and the like. In some embodiments, an optical module as disclosed herein may include a removable or other memory medium, As also discussed above, a mounting aperture that corresponds to a set of optical modules can generally include a mounting profile with mounting portions (e.g., structural edges or surfaces) that allow easy and customizable mounting of particular modules. Looking at FIGS. 2 and 3, for example, the faceplate 16 has a set of mounting apertures including a first mounting aperture 44 and a second mounting aperture 46. The first mounting aperture 44 has a first aperture side mounting portion 48 and a second aperture side mounting portion 52, and the second mounting aperture 46 has a first aperture side mounting portion 50 and a second aperture side mounting portion 54. The first aperture side mounting portions 48, 50 and the second aperture side mounting portion 52, 54 are configured to support and bound either one of the first or second optical modules 12, 14. As such, the first and second mounting apertures 44, 46 are both squared apertures, with the first aperture side mounting portions 48, 50 and the second aperture side mounting portions 52, 54 defining a portion of a square. Similar to different embodiments of the first and second optical modules 12, 14, the portion of the square formed by the first aperture side mounting portions 48, 50 and the second aperture side mounting portions 52, 54 can include right-angle corners or rounded corners, or other squared geometries.

Similarly, it is also contemplated that the first aperture side mounting portions 48, 50 can be provided at an orientation other than perpendicular from the second aperture side mounting portion 52, 54, and that the first and second mounting apertures 44, 46 can have a rotational symmetry relative to at least a part of the first aperture side mounting portions 48, 50 and the second aperture side mounting portions 52, 54. It is further contemplated, that the first aperture side mounting portions 48, 50 or the second aperture side mounting portions 52, 54 may extend along the entirety of, or a portion of, the respective side of the first and second mounting apertures 44, 46.

In some embodiments, a mounting profile of a mounting aperture can be configured to receive an optical module with a mounting profile (or other portions) of the optical module recessed within the mounting aperture. In this regard, for example, the first and second mounting apertures 44, 46 include squared mounting shoulders 70, 72 that are configured to receive and support the mounting profiles of the first and second optical modules 12, 14 to maintain the first and second optical modules 12, 14 at a particular translational and rotational orientation relative to the faceplate 16.

In the illustrated embodiment, the shoulders 70, 72 extend fully around the first and second mounting apertures 44, 46, although other configurations may exhibit recessed (or other) shoulders that extend along fewer (e.g., at least one) sides of a mounting aperture. Fastener supports 74, 76 are also be provided, within or extending from the mounting shoulders 70, 72, and are configured to receive fasteners 78 to securely fasten the first and second optical modules 12, 14 with the first and second mounting apertures 44, 46. In other embodiments, however, other fastener arrangements are possible including otherwise located fasteners or fastener supports, integrated movable fasteners (e.g., rotatable tabs), different numbers of fasteners, and so on.

In some embodiments, fasteners can have a shaft portion provided between the fastener head and the threaded portion of the fastener. The shaft portion can have a diameter sized approximately similar to the diameter of the hole in the fastener supports 74, 76. As a result of the similarly sized diameters, the shaft portions of the fasteners can engage the corresponding portions of the holes in the fastener supports 74, 76 to accurately align the optical modules 12, 14 within the mounting apertures 44, 46 with a precision fit relationship. Other similarly configured arrangements can also provide precision fit engagement at the optical modules 12, 14, as appropriate.

In some embodiments, access features can be provided in order to facilitate easier installation or removal of particular optical modules. This may be particularly useful, for example, in configurations in which part or all of a module is mounted in a recessed configuration. Some access features can be configured as indented access points, such as may receive a user's fingers or a tool to help remove an optical module from a mounting aperture. As illustrated in FIG. 1, for example, recesses 44a, 44b are provided as lateral extensions of the mounting aperture 44 and recesses 46a, 46b are provided as lateral extensions of the mounting aperture 46. The recesses 44a, 44b, 46a, 46b can allow a user to grip or otherwise engage the sides of the optical modules 12, 14 while the modules 12, 14 are recessed into the faceplate 16, and thereby allow relatively easy removal of the optical modules 12, 14 (once the fasteners 78 have been released). In some embodiments, providing recesses or other access features that extend in the same direction from different mounting apertures can provide more useful clearance for users to engage modules, as appropriate, although other configurations are possible.

In different embodiments, different mounting apertures can be arranged differently relative to each other within a particular faceplate. This may be useful, for example, in order to allow particular optical modules to be aligned with each other and with other machine vision equipment for optimal execution of particular operations. In the illustrated embodiment, the first and second mounting apertures 44, 46, continuing to look at FIG. 3, the first and second mounting apertures 44, 46 are linearly aligned with each other in a direction defined by the first aperture side mounting portions 48, 50, with the first-side mounting portions 48, 50 arranged collinearly on the faceplate 16. Further, the first and second mounting apertures 44, 46 are also aligned along a centerline 86 of the faceplate 16 (see FIG. 4), with a center 66 of the first mounting aperture 44 and a center 68 of the second mounting aperture 46 placed along the centerline 86.

In other configurations, however, other orientations are possible. For example, some sets of mounting apertures can exhibit mounting portions that are not linearly aligned with each other or side mounting portions that are angled relative to each other at oblique angles. Similarly, some sets of mounting apertures may not be aligned (or may not be centered) along a centerline of a faceplate or other similar reference feature. And, although the first and second mounting apertures 44, 46 are substantially identical, so as to interchangeably receive either of the first and second optical modules 12, 14 in a variety of different orientations, some arrangements may include non-identical mounting apertures, such as may be configured to interchangeably receive different optical modules or as may be configured to receive the same optical modules but only in a select subset of otherwise possible orientations.

Figure 4:
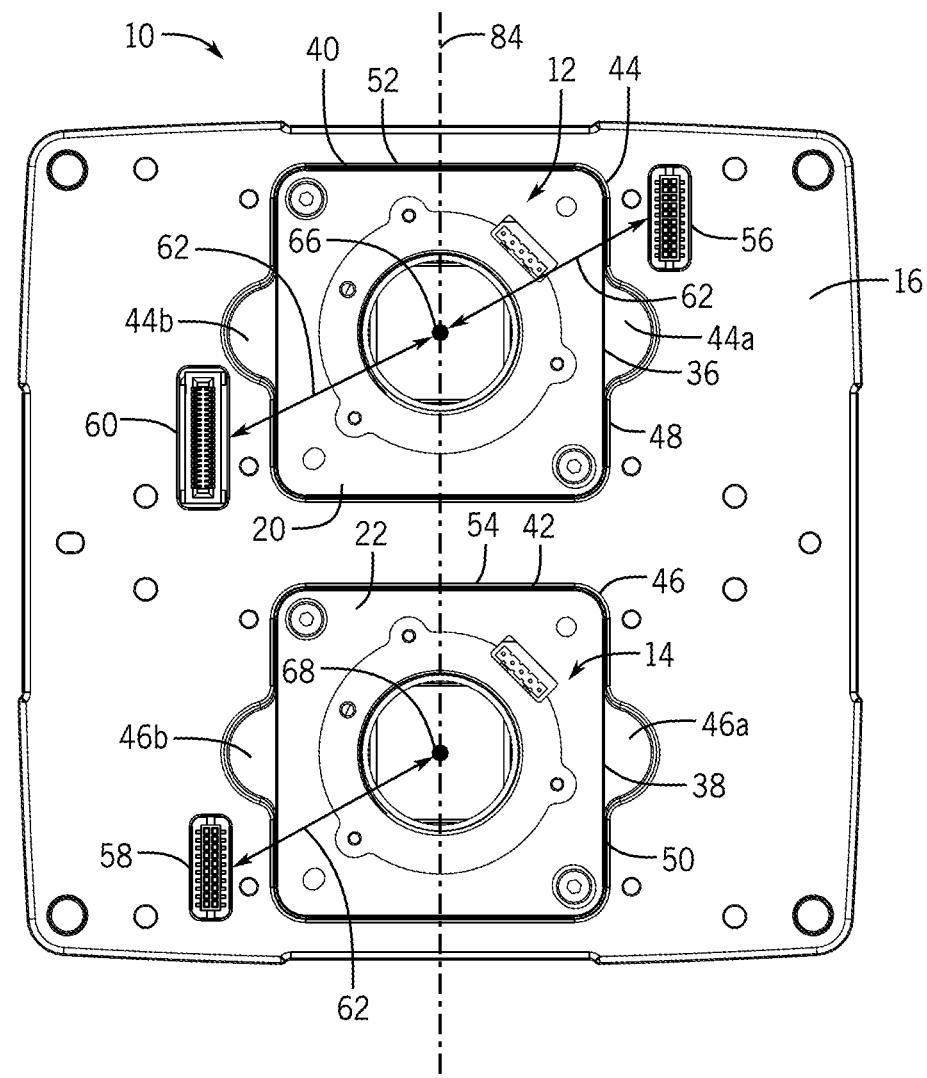
FIG. 4 is a front elevation view of the machine vision system of FIG. 1.
Figure 5:
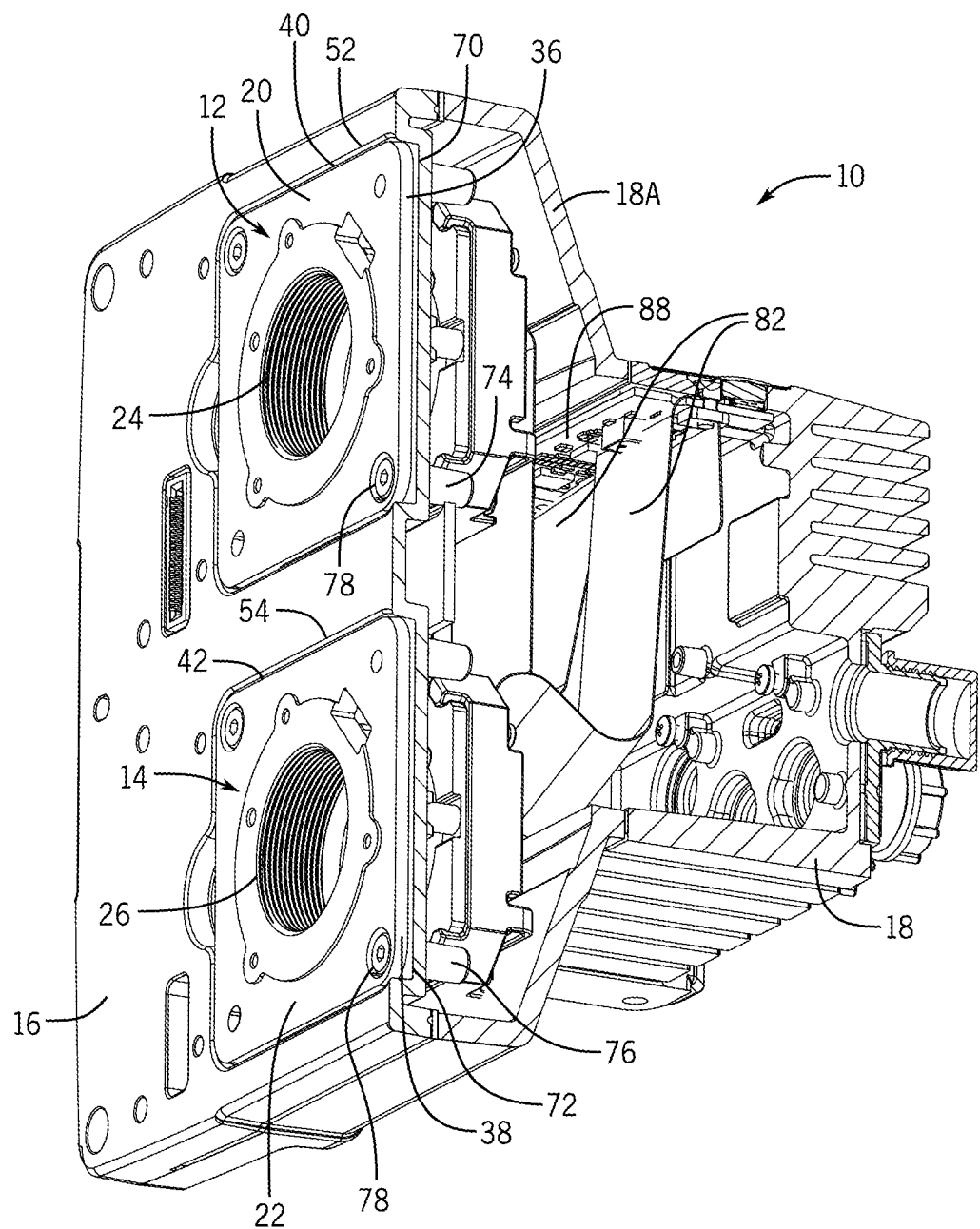
FIG. 5 is an isometric sectional view of the machine vision system along line 5-5 of FIG. 1.

In some embodiments, as also discussed above, communication channels can be provided for communication between modules and a large system to which the modules are attached. Referring to FIG. 4, for example, the faceplate 16 also includes a set of I/O ports including a first I/O port 56, a second I/O port 58, and a third I/O port 60. The I/O ports 56, 58, 60 are electrically connected to the computing device 88 in the housing 18 and can be configured to accept electrical connections for powering or controlling accessories such as, but not limited to, structured lights, adjustable lenses, or steerable mirrors. In some embodiments, a standardized configuration for an I/O port relative to a mounting aperture may further contribute to ready interchangeability of particular modules. For example, the I/O ports 56, 58 are of the same type and are provided at a common distance 62 from the respective centers 66, 68 of the first and second mounting apertures 44, 46. Similarly, although the I/O ports 56, 60 are of different types, they are both provided at the common distance 62 from the center 66 of the first mounting aperture 44. Thus, for example, electrical connectors of different types for different modules can be readily connected to a relevant I/O port, regardless of which mounting aperture 44, 46 receives a particular module.

In some embodiments, other configurations are possible. For example, some embodiments can include other arrangements of I/O ports, such as arrangements that include multiple ports similar to the I/O ports 56, 58, but distributed at multiple locations around each of the relevant mounting apertures.

With the illustrated arrangement, and other similar arrangements according to the disclosed technology, optical modules can be interchangeably mounted at different locations and at different locations on a faceplate in order to accommodate a wide range of machine-vision operations. Looking back at FIG. 1, for example, the faceplate 16 is shown in a first orientation, the first optical module 12 is shown in a first orientation within the first mounting aperture 44 and the second optical module 14 is shown in a first orientation within the second mounting aperture 46. The first-side mounting portion 36 of the first optical module 12 is engaged with the first aperture side mounting portion 48 of the first mounting aperture 44 and the second-side mounting portion 40 is engaged with the second aperture side mounting portion 52. Further, the first-side mounting portion 38 of the second optical module 14 is shown engaged with the first aperture side mounting portion 50 of the second mounting aperture 46 and the second-side mounting portion 42 is engaged with the second aperture side mounting portion 52.

Figure 6:
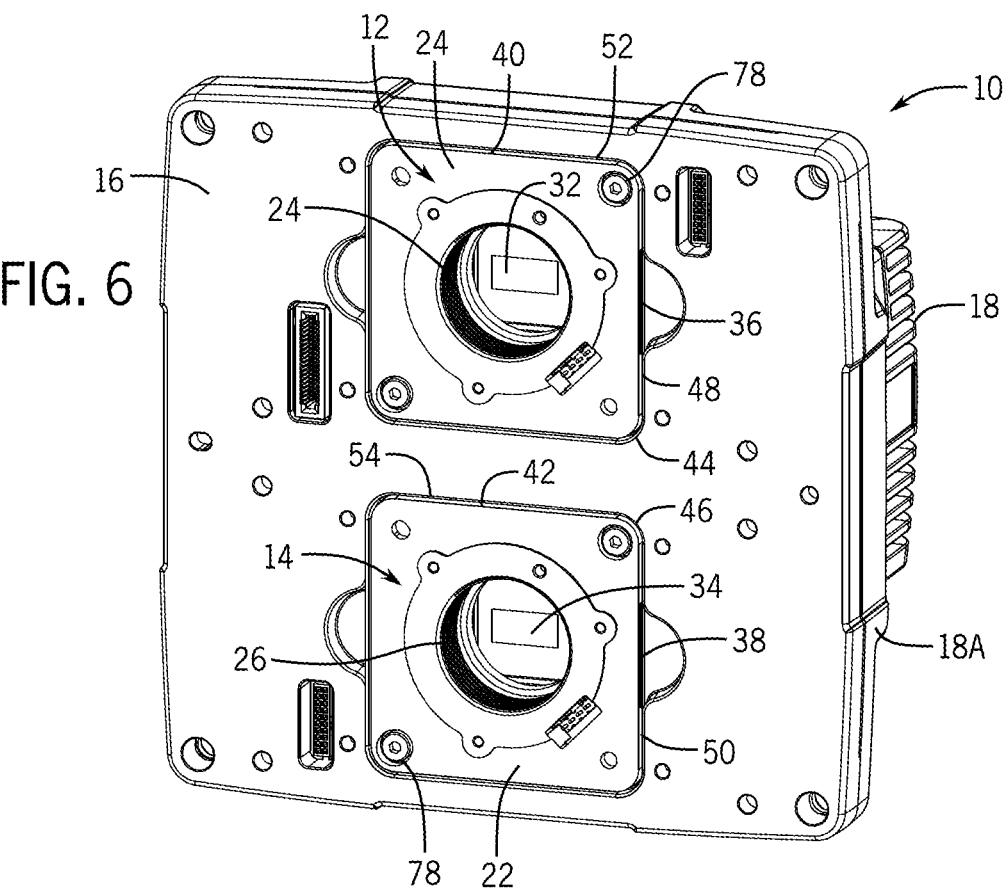
FIG. 6 is an isometric view of the machine vision system of FIG. 1 with the set of modules in another orientation.
Figure 7:
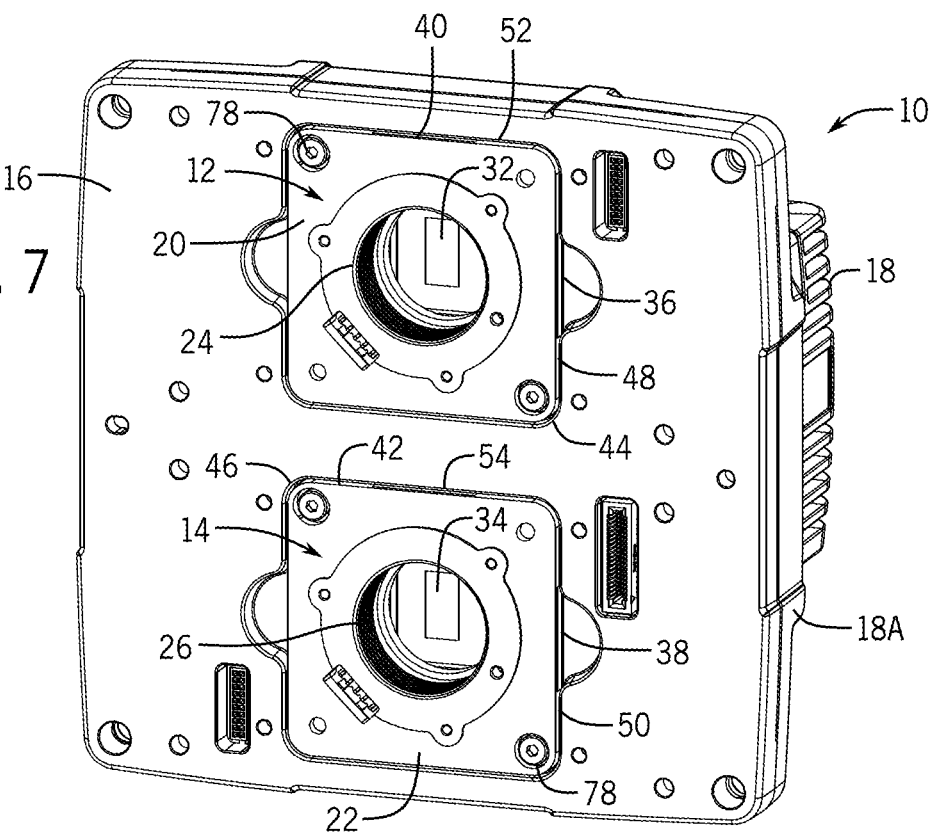
FIG. 7 is an isometric view of the machine vision system of FIG. 1 with the set of modules in another orientation.

The configuration illustrated in FIG. 1 may be particularly useful for a particular set of machine vision operations or operational contexts. Further, because of the rotational symmetry of the mounting portions of the first and second optical modules 12, 14 and of the first and second mounting apertures 44, 46, each of the first and second optical modules 12, 14 can be alternatively secure in either one of the apertures 44, 46. And because of the common mounting geometries of the optical modules 12, 14 and the mounting apertures 44, 46, the optical modules 12, 14 can be secured in either of the mounting apertures 44, 46 at a discrete plurality of different rotational orientations. For example, as shown in FIG. 6, the first and second optical modules 12, 14 are shown in a second orientation with a rotational difference of 90 degrees clockwise (i.e., rotated 90 degrees clockwise) from the first orientation. As another example, as shown in FIG. 7, the first and second optical modules 12, 14 are shown in a third orientation with a rotational difference of 90 degrees clockwise from the second orientation in FIG. 6. Although not shown, it should be understood that the first and second optical modules 12, 14 can be provided in a fourth orientation with a rotational difference of 90 degrees counter-clockwise from the first orientation shown in FIG. 1.

Aside from provide a discrete set of rotational orientations, certain configurations of mounting portions of optical modules and mounting apertures can also help to secure the modules against rotation relative to mounting apertures. For example, engagement of the squared (and linear) mounting portions 36, 38, 40, 42 of the first and second optical modules 12, 14 with the squared (and linear) mounting portions 46, 48, 50, 52 of the first and second mounting apertures 44, 46 can relatively firmly secure the first and second optical modules 12, 14 against rotation relative to the faceplate 16, as may allow for relatively precise calibration and operation of related optical systems (e.g., dimensioners, imaging devices, and so on).

The first and second optical modules 12, 14 are receivable within either the first or second mounting apertures 44, 46, but only one at a time. Further, the orientations and locations of the first and second optical modules 12, 14 as expressly discussed above are provided as examples only. For example, the first optical module 12 can be provided in the first orientation in the second mounting aperture 46 with the second optical module 14 provided in the second orientation in the first mounting aperture 44, and so on.

It can be advantageous in some embodiments to automatically monitor or otherwise manage the orientation and placement of the first and second optical modules 12, 14 within the first and second mounting apertures 44, 46. To that end, for example, a position indicator can be included in the machine vision system 10 to indicate a position (e.g., orientation or location) of the first and second optical modules 12, 14 when received within a mounting aperture. Some position indicators can operate by mechanical contact to locate (e.g., hold or provide tactile feedback to) the first and second mounting bodies for installation. For example, a detent and receptacle (e.g., divot) or interlocking teeth on a mounting body and around a mounting aperture can indicate one or more rotational alignments for a particular optical module.

Some embodiments can indicate by electrical signal an installed orientation of the respective mounting body. For example, a pin can extend from a portion of both the first and second optical modules 12, 14 to extend into a receptacle in the mounting shoulders 70, 72 of the first and second mounting apertures 44, 46. An electrical circuit activated by the pin in a particular receptacle can then indicate a particular orientation. In some cases, such an electrical circuit can be configured to determine which of the first and second optical modules 12, 14 is currently attached at a particular mounting aperture. In another form of a location sensor, a first (e.g., fixed) magnet can be selectively placed on or within the first and second optical modules 12, 14 so as to interact with a second (e.g., fixed) magnet selectively placed on the mounting shoulders 70, 72 or at a location within the faceplate 16 when the first and second magnets are within a certain proximity (e.g., a magnetically operated mechanical or electrical switch).

Figure 8:
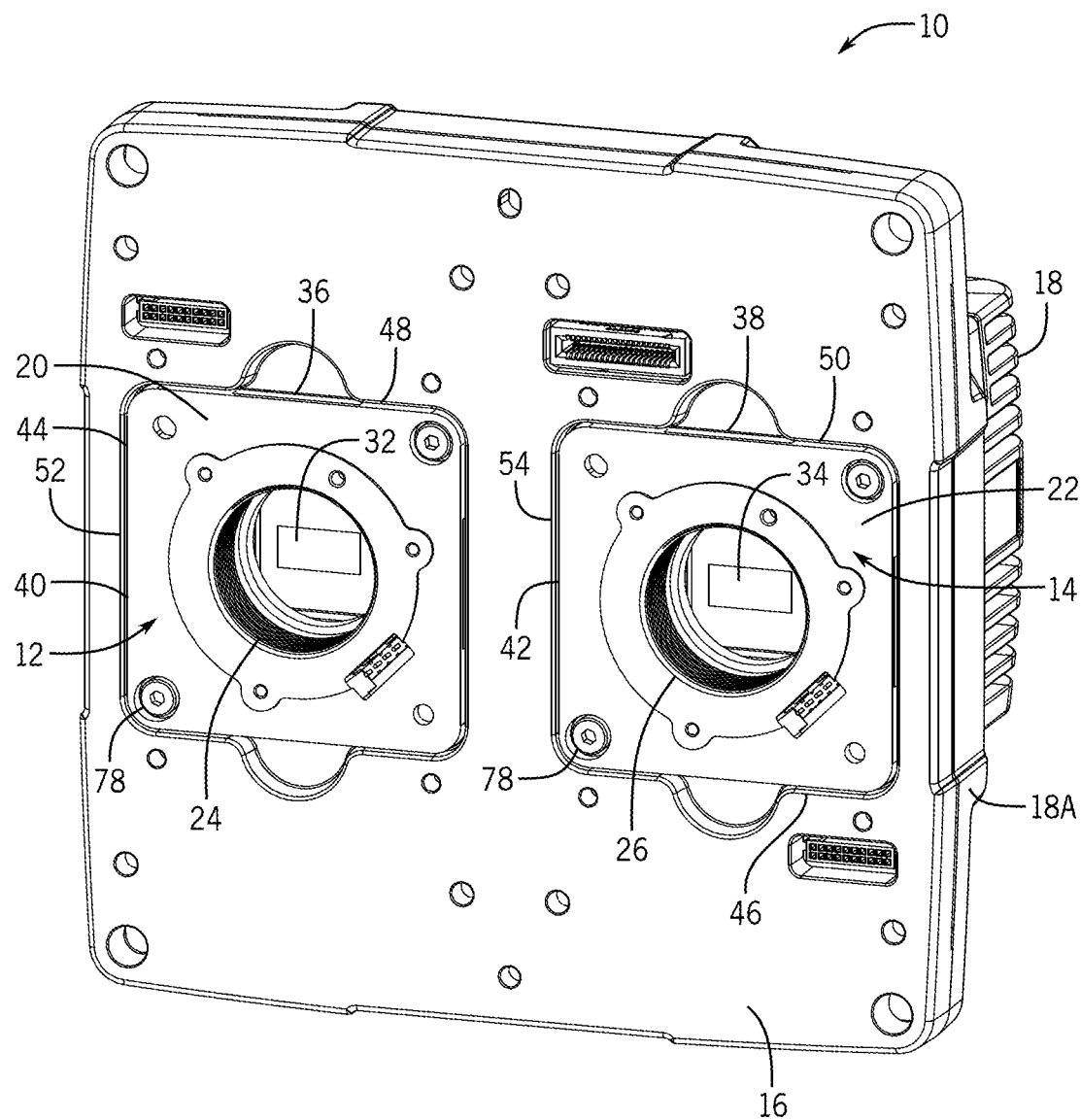
FIG. 8 is an isometric view of the machine vision system of FIG. 1 with the faceplate in another orientation.

Looking at FIGS. 6-8 the machine vision system 10 can provide a dual sensor system that includes both the first and second imaging sensors 32, 34 of the first and second optical modules 12, 14. In some embodiments, an imaging sensor can be shaped as elongated rectangle such as can have horizontal/vertical pixel rations of 5:4, 4:3, or 16:9. Correspondingly, in some dual sensor system applications either of the imaging sensors 32, 34 can be aligned in a horizontal direction (FIG. 6), and in other applications either of the imaging sensors can be aligned vertically 32, 34 (FIG. 7). In different embodiments, due to the rotational adaptability of the modules 12, 14, the long axes of the image sensors 32, 34 can be aligned in parallel and non-collinear (FIG. 6), in parallel and co-linear (FIG. 7), perpendicular to each other (e.g., combining the orientation of the sensor 32 in FIG. 6 and the orientation of the sensor 34 in FIG. 7), or otherwise.

In some embodiments, as also noted above, a faceplate can be removable and rotationally adjustable relative to a larger system. For example, FIG. 8 illustrates that the faceplate 16 can be positioned in a second orientation relative to the housing 18, as compared to the orientation of FIG. 1. The second orientation of the faceplate 16 has a rotational difference of 90 degrees counter-clockwise (i.e., the faceplate 16 is rotated 90 degrees (counter-clockwise)) from the first orientation of the faceplate 16 in FIG. 7. The ability to rotate the orientation of the faceplate 16 relative to the housing 18 allows the first and second optical modules 12, 14 to be aligned horizontally (e.g., parallel to a housing axis 84 (FIG. 3)) or vertically (e.g., perpendicular to the housing axis 84; FIGS. 1, 6, and 7), as may facilitate certain types of machine vision operations, including for modules other than the optical modules 12, 14. It should be understood that the faceplate 16 can also be arranged in a third orientation by rotating the faceplate 16 an additional 90 degrees (counter-clockwise) and a fourth orientation by rotating the faceplate 16 90 degrees (clockwise) from the first orientation in FIG. 7. Further, other embodiments may exhibit other types of adjustability for a faceplate or other mounting structure for optical modules.

Figure 9:
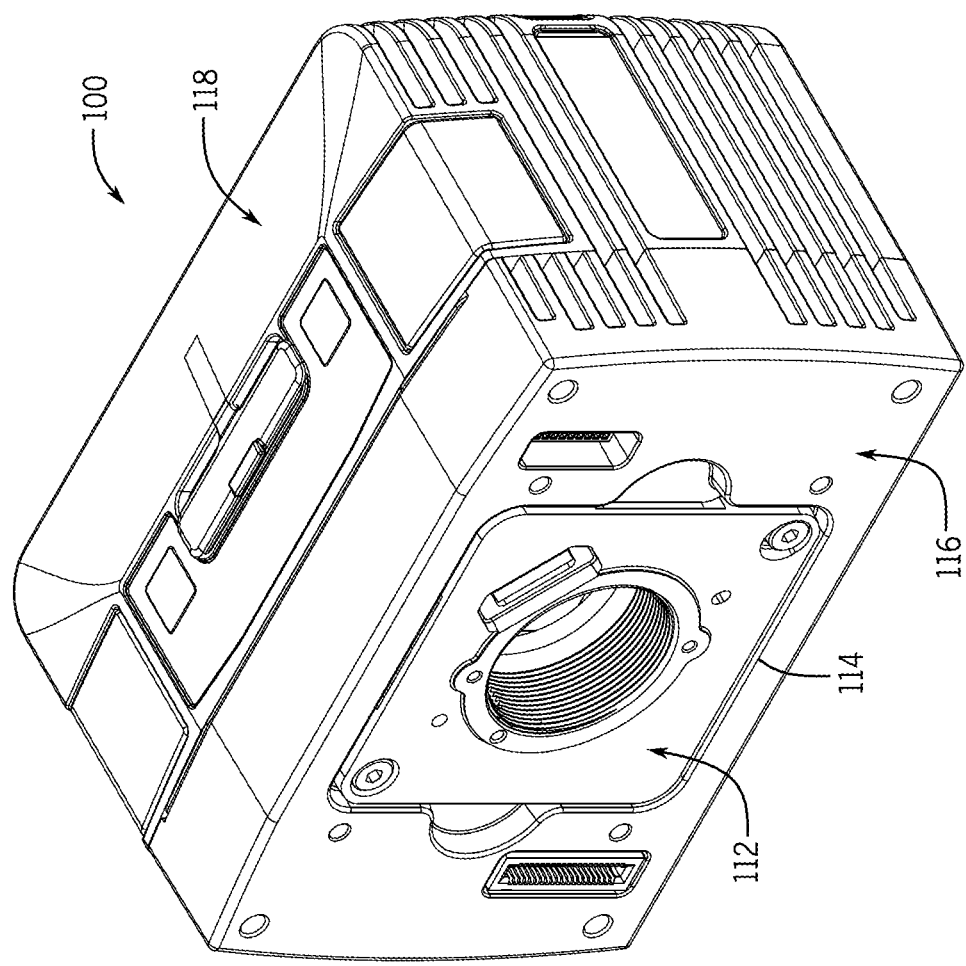
FIG. 9 is an isometric view of a machine vision system with a faceplate and an interchangeable optical module in accordance with some embodiments of the technology.

Although the ability to customizably use two modules at once may be useful in many contexts, some embodiments may exhibit a different number of modules and mounting apertures. For example, FIG. 9 illustrates another embodiment of a machine vision system 100 configured for use with only a single optical module at a time. In many aspects, the machine vision system 100 is similar to the machine vision system 10 described above and similar numbering in the 100 series is used for the machine vision system 100. For example, the machine vision system 100 has a faceplate 116 coupled to a housing 118 and an optical module 112 mounted within a mounting aperture 144 within the faceplate 116. The optical module 112 is generally similar to the optical modules 12 and can be mounted within the aperture 144 in similar configurations to that described above with respect to the first and second optical modules 12, 14 within the first and second apertures 44, 46 of the faceplate 16. In some aspects, however, the machine vision systems 10, 100 differ from each other. For example, the faceplate 116 has only the one mounting aperture 144, in which the optical module 112 is mounted. Thus the machine vision system 10 can generally be used only with one optical module at a time, although other modules can be swapped with the optical module 112 to provide a wide range of functionality.

In some optical reading scenarios, for example, when reading objects as they move along a conveyor, vision systems with multiple cameras may be required to cover the width of the conveyor, particularly for fixed-position cameras. For example, separate cameras can be separately installed relative to a conveyor in order to collectively provide imaging coverage for the entire width of the conveyor. However, conventional multiple-camera vision systems can be more complex to install because the individual systems may need to be synced together to produce the desired outcome. In some conventional vision systems, a vision system include a housing with multiple cameras, but a width of the relevant conveyor may require the cameras to be spaced relatively far apart to cover the required viewing area of the conveyor. As a result, such systems are usually relatively bulky, because of the required distance between the cameras. Further, the distance between cameras and a processing unit in both of these configurations can reduce signal quality, because a relatively large distance between these elements can adversely affect stability and smoothness of data transfer.

To address these and other issues, in some embodiments of the technology, a multi-module vision system can be provided, in which optical modules can be oriented in a plurality of orientations to alter at least one of the FOV of the optical module and the angle of the optical axis. The plurality of mounting orientations may be achieved by altering the orientation of the modules relative to the housing and/or varying the orientation of components within the modules. For example, some optical modules can be configured to be angularly or translatably adjustable relative to a reference frame (e.g., a plane defined by a front of a faceplate of a vision system, or an imaging plane of an image sensor), in order to correspondingly adjust the orientation and overlap of the associated FOVs.

The ability to customizably angle or translate optical modules relative to a reference frame can allow some embodiments to be easily modified to be used in different optical viewing applications without requiring entirely different camera packages (e.g., by simply adjusting or swapping imaging modules relative to a common housing and other components). Thus, in some cases, the customizable modularity of some embodiments can improve overall adaptability of any given system and can streamline manufacturing and in-field set-up by generally requiring lower levels of effort and allowing the use of a reduced number of modular components for a desired range of functional capabilities. Additionally, the modularity of the system, in some embodiments, can help to minimize distance between optical components and the associated processing unit, which can increase the signal transfer rate and quality between the optical modules and the processing unit. Relatedly, a relatively short distance between optical modules (and the processing unit) can allow some embodiments to be substantially more compact than alternative, conventional systems.

Figure 10:
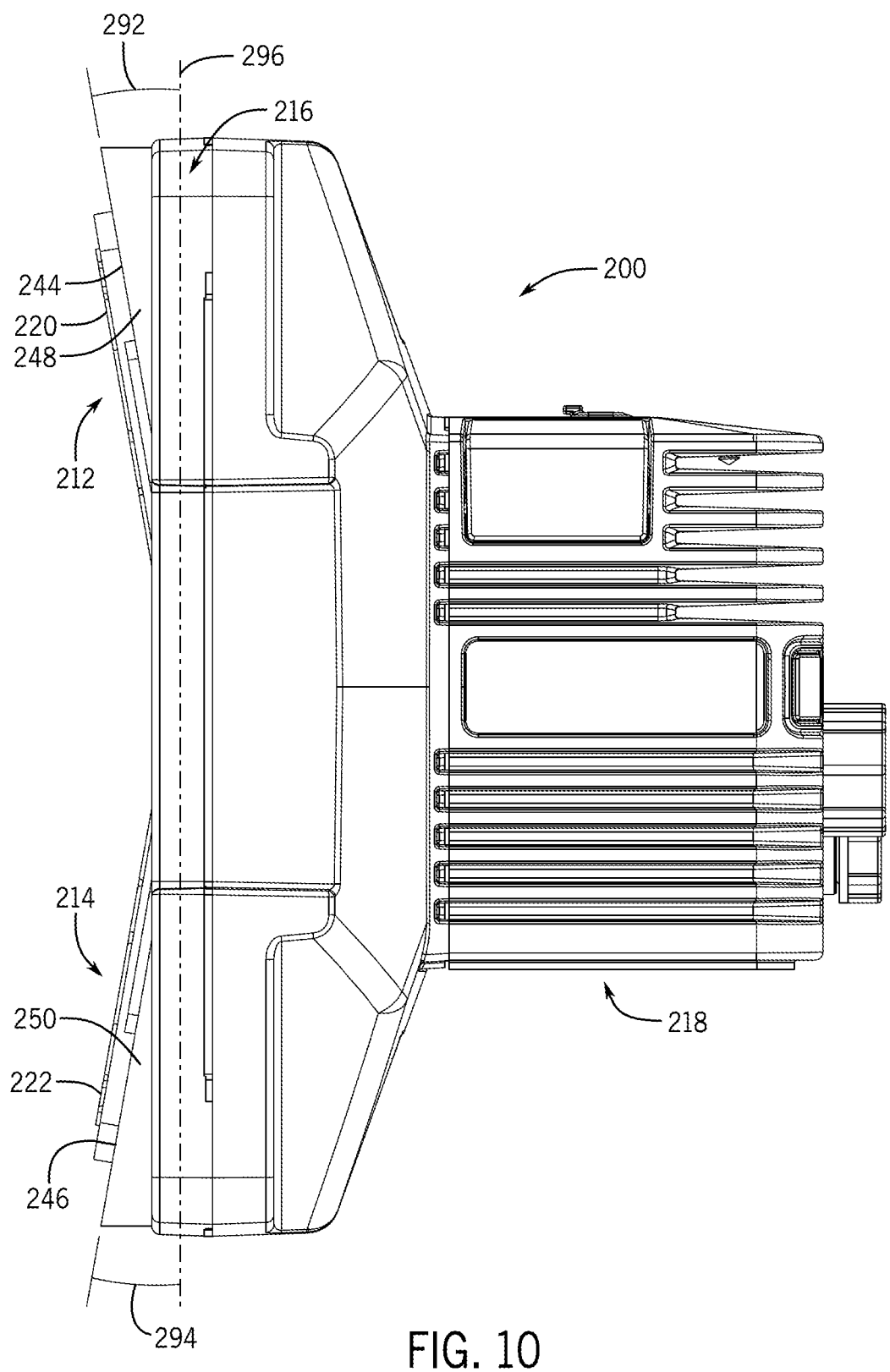
FIG. 10 is a right side elevation view of a machine vision system with a faceplate and a set of angled interchangeable optical modules in accordance with some embodiments of the technology.

In this regard, for example, FIG. 10 illustrates another embodiment of a machine vision system 200. In many aspects, the machine vision system 200 is similar to the machine vision systems 10, 100 described above and similar numbering in the 200 series is used for the machine vision system 200. For example, the machine vision system 200 has a faceplate 216 coupled to a housing 218. The machine vision system 200 also has a first optical module 212 and a second optical module 214 mounted to the faceplate 216.

The first and second optical modules 212, 214 can generally be mounted within the faceplate 216 in similarly customizable configurations to those described above with respect to the first and second optical modules 12, 14 within the first and second apertures 44, 46 of the faceplate 16.

In some aspects, however, the machine vision system 200 differs from the machine vision systems 10, 100. For example, rather than sitting flushly against a flat front surface of the faceplate 116, the first and second optical modules 212, 214 are positioned to angle forward of the faceplate 116 at an angle 292, 294, relative to a plane 296 along which the faceplate 216 lies. Thus, optical devices (not shown) on the modules 212, 214 can be used in operations, such as triangulation or 3D imaging, that require non-parallel optical axes or other similar configurations.

In different embodiments, non-planar mounting for optical modules can be provided in different ways. For example, the angles 292, 294 can be provided by angled mounting portions, or wedges (e.g., first aperture side mounting portions 248, 250 in FIG. 10) of the first and second apertures 244, 246 of the faceplate 216 as shown and discussed further below. Additionally, or alternatively, the angles 292, 294 can be provided by the form of the first and second mounting bodies 220, 222 of the first and second optical modules 212, 214. For example, the mounting bodies 220, 222 can be configured to include or to customizably interoperate with structural wedges, that can provide a desired angle for an associated optical axis.

As used herein, "wedges" is used to refer to fixed structures that can support an optical module or select optical components at a particular non-square angle (or angles) relative to a reference frame. For example, within the context of a machine vision system, a wedge is generally a structure that supports an optical module or select optical components (e.g., a lens assembly) to align an associated optical axis at an oblique angle relative to a plane defined by a face plate of a imaging assembly or an imaging plane of an associated image sensor. In some embodiments, "wedges" can exhibit a block-like shape with triangular or trapezoidal side profiles, to provide a continuous, angled support surface that engages a faceplate or an optical module (or components thereof) to provide non-square support for optical components of the optical module. In some embodiments, "wedges" can exhibit more discrete structures that collectively provide non-square support, but may not necessarily be block-like, or exhibit solid triangular or trapezoidal sides.

Figure 11:
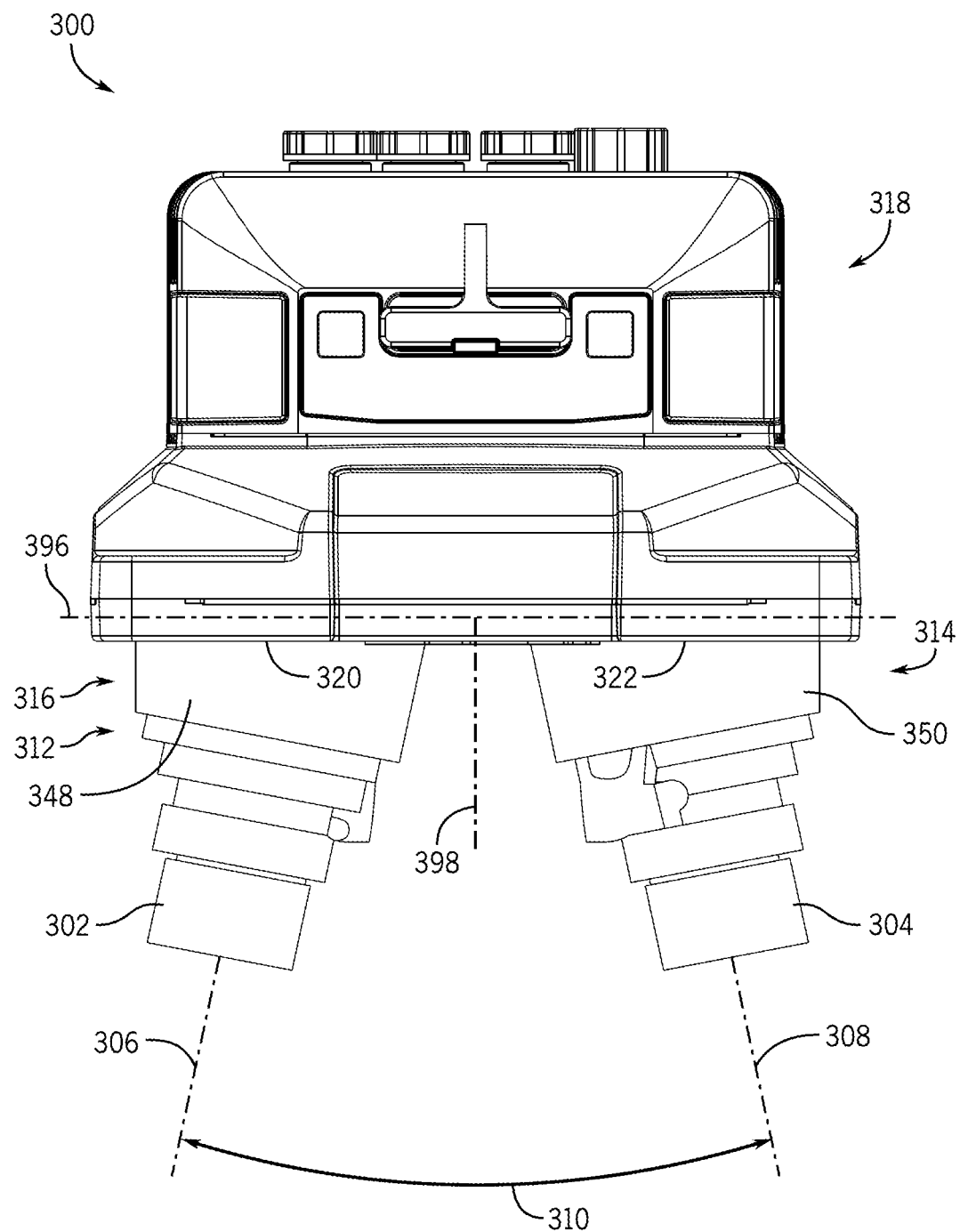
FIG. 11 is a bottom view of a machine vision system with a faceplate and a set of interchangeable optical modules and wedges in accordance with some embodiments of the technology.

In some embodiments, the angles 292, 294, as shown in FIG. 10, can be the same or similar relative to each other. In other embodiments the angles of the optical modules relative to the plane of the front plate can be dissimilar. In some embodiments, the angles of first and second optical modules can be adjustable relative to a reference frame (e.g., the plane 296), including through adjustment of mounting structures in (or relative to) the relevant mounting apertures, or through adjustment or selection of different optical modules. In some embodiments, the first and second optical modules can be angled away from each other (e.g., as shown in FIG. 11 and discussed below) rather than toward each other as shown in FIG. 10, or can angle in the same direction. In some embodiments, the angles of each of the first and second optical modules can be derived from different axes of rotation (e.g., so that the modules are angled in opposite lateral directions). In some embodiments, one of the angles of the first or second modules can be zero (i.e., the module can be non-angled).

FIG. 11 illustrates another embodiment of a machine vision system 300. In many aspects, the machine vision system 300 is similar to the machine vision systems 10, 100, 200 described above and similar numbering in the 300 series is used for the machine vision system 300 when possible. For example, the machine vision system 300 has a faceplate 316 coupled to a housing 318. The machine vision system 300 also has a first optical module 312 and a second optical module 314 mounted to the faceplate 316. The first and second optical modules 312, 314 can generally be mounted within the faceplate 316 in similarly customizable configurations to those described above with respect to the first and second optical modules 12, 14 within the first and second apertures 44, 46 of the faceplate 16. The first optical module 312 has a first mounting body 320 and a first rectangular image sensor (hidden). The second optical module 314 has a second mounting body 322 and a second rectangular image sensor (hidden). Further, the imaging sensors of the first and second optical modules 312, 314 can be aligned in a horizontal direction (see e.g., imaging sensors 32, 34 in FIG. 6), and in other applications either (or both) of the imaging sensors can be aligned vertically (see e.g., imaging sensors 32, 34 in FIG. 7). In different embodiments, due to the rotational adaptability of the modules 312, 314, the long axes of the image sensors can be aligned in parallel and non-collinear (see, e.g., FIG. 6), in parallel and co-linear (see e.g., FIG. 7), perpendicular to each other (e.g., combining the orientation of the sensor 32 in FIG. 6 and the orientation of the sensor 34 in FIG. 7), or otherwise.

In some aspects, however, the machine vision system 300 differs from the machine vision systems 10, 100, 200. For example, although they can be included on the other embodiments of the machine vision systems described herein, first and second imaging lenses 302, 304 are shown and are part of the first and second optical modules 312, 314. The first and second imaging lenses 302, 304 define first and second optical axes 306, 308 and corresponding FOVs (not shown).

Further, the mounting orientation of the first optical module 312 is customizably defined by a first wedge 348 and the second optical module 314 is customizably defined by a second wedge 350. It is contemplated that the wedges can provided as an integral or interchangeable component of an optical vision module (e.g., the modules 312, 314), as an integral or interchangeable component of a faceplate (e.g., the faceplate 316), or as a distinct separate component. As shown in FIG. 11, the first and second wedges 348, 350 are included as parts of the optical modules 312, 314 and provide a divergent orientation of the first and second optical modules 312, 314, respectively, and therefore a divergent orientation of the first and second optical axes 306, 308. In other words, the first and second wedges 348, 350 define a divergent angle 310 between the first and second optical axes 306, 308.

In some embodiments, the divergent angle 310 can be between 5 degrees and 30 degrees, although other angles are also possible. Generally, in this configuration, the first and second optical axes 306, 308 will be centered on an imaging area of the first and second imaging sensors (hidden), although other approaches are also possible. Further in this regard, the cylindrical mounting wedges 348, 350 can be used to collectively orient, at a desired angle, all optical components of the optical modules 412, 414 (e.g., the lenses 402, 404 and the associated imaging sensor), or only select optical components of the optical modules 412, 414.

Similar to the machine vision system 200 discussed above, wedges to be used with the first and second modules 312, 314 can be adjustable, removable, and interchangeable to provide different imaging configurations. In some embodiments, the wedges 348, 350 can be adjustable, to selectively provided different orientations of the optical modules 312, 314 and the optical axes 306, 308. In some embodiments, other wedges (not shown) having different angular profiles can be installed (e.g., swapped directly for the wedges 348, 350) to provide different angles of orientation of the first and second optical axes 306, 308 of the first and second imaging lenses 302, 304, respectively (e.g., relative to a reference line 398 extending perpendicularly from the plane 396 of the faceplate 316). In some embodiments, wedges can be arranged to provide a mounting orientation in which the first and second optical axes 306, 308 intersect (see also FIG. 18).

Figure 12:
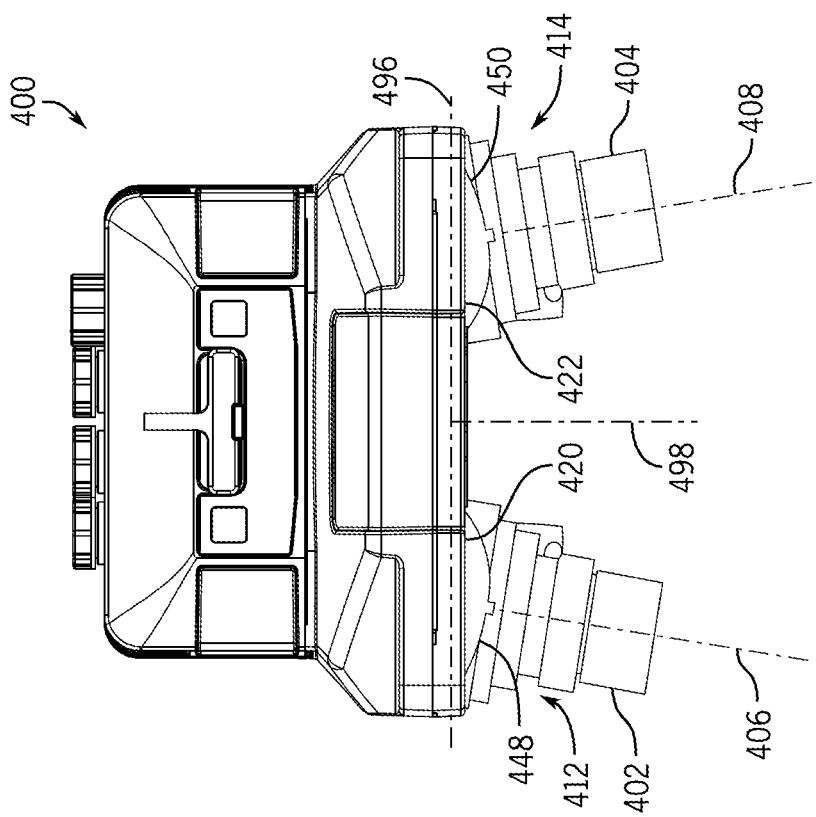
FIG. 12 is a bottom view of a machine vision system with a faceplate and a set of interchangeable optical modules and cylindrical flanges, illustrating a range of motion of the optical modules in accordance with some embodiments of the technology.
Figure 13:
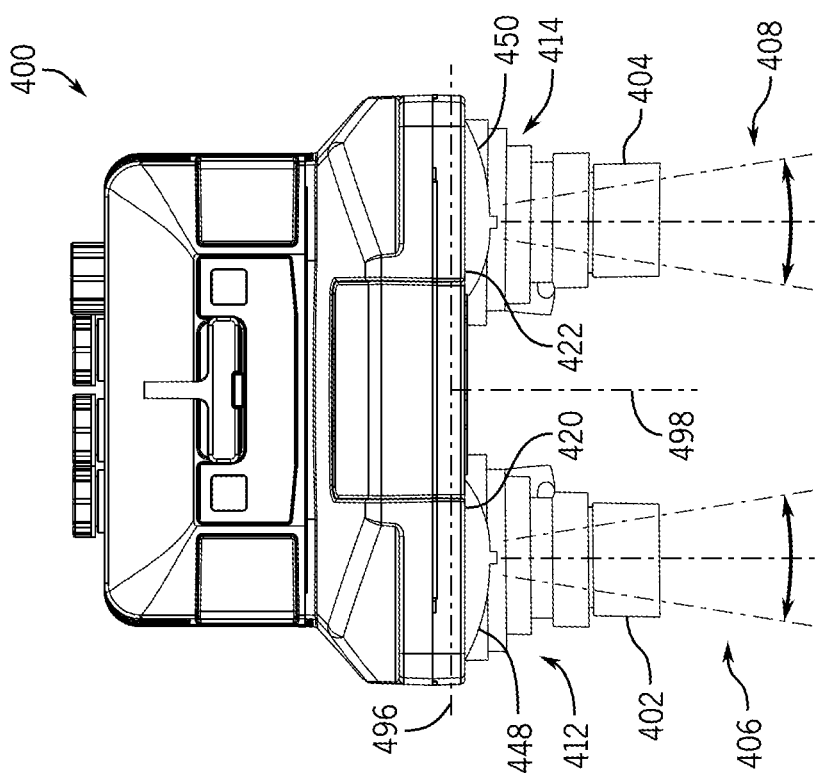
FIG. 13 is a bottom view of the machine vision system of FIG. 12 with the optical modules in a diverging optical axis configuration.

Although wedges (e.g., wedge-shaped support blocks) can be useful in some cases, other support structures can be used in some embodiments to selectively provide different angular orientations for optical axes (or for optical modules generally). In this regard, for example, FIGS. 12 and 13 illustrate another embodiment of a machine vision system 400. In many aspects, the machine vision system 400 is similar to the machine vision systems 10, 100, 200, 300 described above and similar numbering in the 400 series is used for the machine vision system 400 when possible. For example, the machine vision system 400 has a faceplate 416 coupled to a housing 418. The machine vision system 400 also has a first optical module 412 and a second optical module 414 mounted to the faceplate 416. The first and second optical modules 412, 414 can generally be mounted within the faceplate 416 in similarly customizable configurations to those described above with respect to the first and second optical modules 12, 14 within the first and second apertures 44, 46 of the faceplate 16 (see, e.g., FIG. 1).

In the illustrated embodiment, the first optical module 412 has a first mounting body 420, a first imaging lens 402, and a first rectangular image sensor (hidden). The second optical module 414 has a second mounting body 422, a second imaging lens 404, and a second rectangular image sensor (hidden). Further, the imaging sensors of the first and second optical modules 412, 414 can be aligned in a horizontal direction (see e.g., imaging sensors 32, 34 in FIG. 6), and in other applications either of the imaging sensors can be aligned vertically (see e.g., imaging sensors 32, 34 in FIG. 7). In different embodiments, due to the rotational adaptability of the modules 412, 414, the long axes of the image sensors can be aligned in parallel and non-collinear (see, e.g., FIG. 6), in parallel and co-linear (see e.g., FIG. 7), perpendicular to each other (e.g., combining the orientation of the sensor 32 in FIG. 6 and the orientation of the sensor 34 in FIG. 7), or otherwise.

In some aspects, however, the machine vision system 400 differs from the machine vision systems 10, 100, 200, 300. For example, the mounting orientation of the first optical module 412 can be altered by adjusting the optical module 412 relative to (e.g., along) a first cylindrical mounting surface 448 and the second optical module 414 can be altered by adjusting the optical module 414 relative to (e.g., along) a second cylindrical mounting surface 450. Thus, the first and second cylindrical mounting surfaces 448, 450 are configured to provide the ability to selectively alter the orientation of the first and second optical modules 412, 414, respectively. For example, FIG. 12 illustrates a range of potential angles of orientation for each of the first and second optical axes 406, 408 of the first and second imaging lenses 402, 404, respectively, relative to a reference line 498 extending perpendicularly from the plane 496 of the faceplate 416 (although other reference frames can also be considered, including as discussed above). In this regard, the cylindrical mounting surfaces 448, 450 can be used to collectively orient, at a desired angle, all optical components of the optical modules 412, 414 (e.g., the lenses 402, 404 and the associated imaging sensor), or only select optical components of the optical modules 412, 414.

In the embodiment illustrated, the angle range of each of the first and second optical axis is about 60 degrees, although other ranges are also possible. Correspondingly, the machine vision system 400 can be configured to orient the first and second optical modules 412, 414 with the first and second optical axes 406, 408 angled toward each other (see inner range optical axes 406, 408 illustrated in FIG. 12), parallel with each other (see central alignment of optical axes 406, 408 illustrated in FIG. 12), or diverging from each other (see FIGS. 13).

In some embodiments, including as shown in FIGS. 12 and 13, a cylindrical mounting structure can include a support surface with only a limited angular range (e.g., not a full circumferential surface). In some embodiments, a cylindrical mounting structure can allow pivoting adjustment of an optical module after the optical module is attached to a faceplate, including through the use of known rotatable support structures. In some embodiments, a cylindrical mounting structure can be fixed relative to a faceplate (or optical module), but can allow an optical module to be selectively secured to the faceplate at any of a range of angular orientations.

Figure 15:
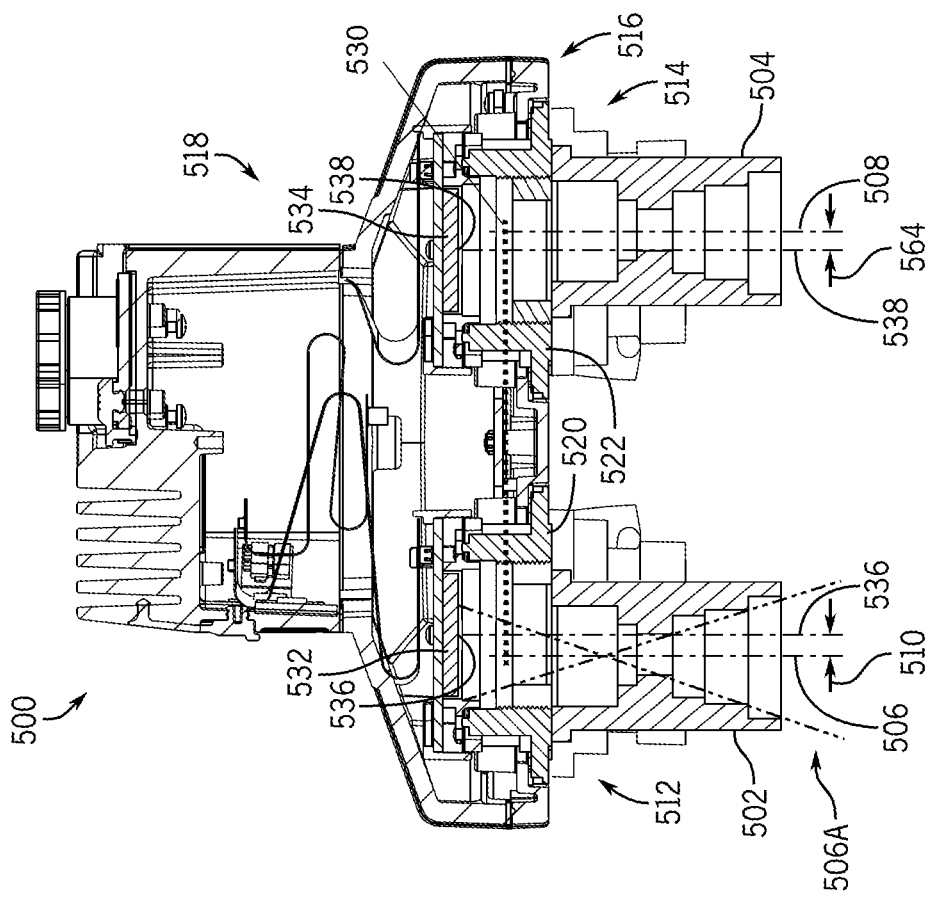
FIG. 15 is a cross-sectional view of the machine vision system of FIG. 14 with the optical axes of each of the lenses laterally shifted with respect to the respective image sensor.
Figure 14:
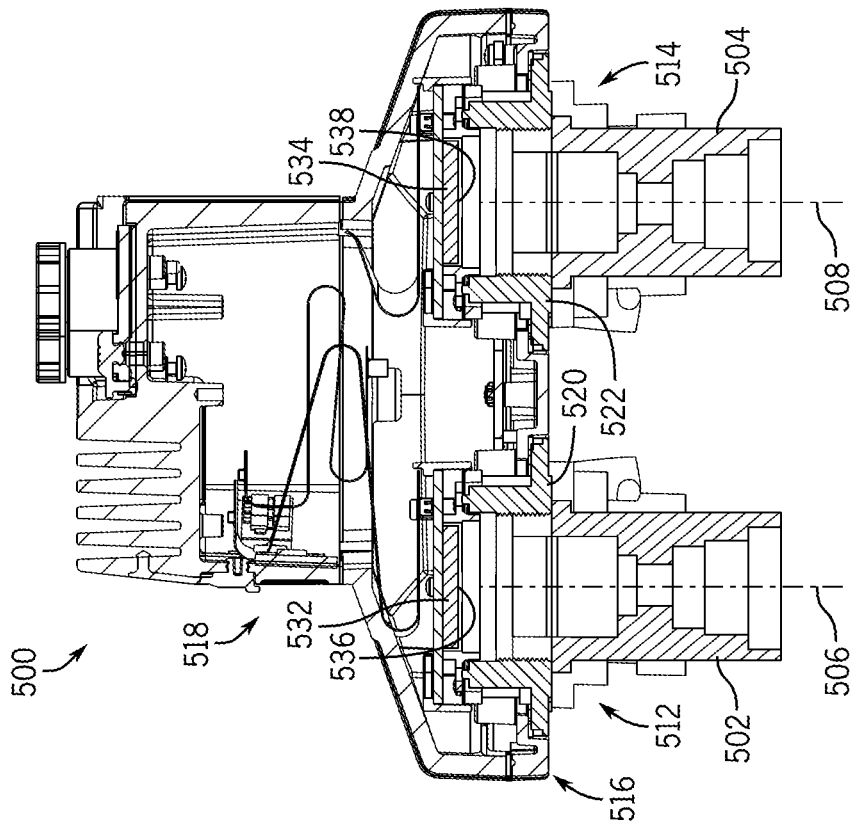
FIG. 14 is a cross-sectional view of a machine vision system with a faceplate and a set of interchangeable optical modules illustrating an alignment of optical axes of image sensors centered on the respective field of view of lenses in accordance with some embodiments of the technology.

In some embodiments, a modular configuration for a machine vision system can allow optical modules to be secured to a machine vision system at a variety of translated orientations (e.g., without rotation to different angular orientations as discussed above). In this regard, for example, FIGS. 14 and 15 illustrate another embodiment of a machine vision system 500. In many aspects, the machine vision system 500 is similar to the machine vision systems 10, 100, 200, 300, 400 described above and similar numbering in the 500 series is used for the machine vision system 500 when possible. For example, the machine vision system 500 has a faceplate 516 coupled to a housing 518. The machine vision system 500 also has a first optical module 512 and a second optical module 514 mounted to the faceplate 516. The first and second optical modules 512, 514 can generally be mounted within the faceplate 516 in similarly customizable configurations to those described above with respect to the first and second optical modules 12, 14 within the first and second apertures 44, 46 of the faceplate 16.

In the illustrated embodiment, the first optical module 512 has a first mounting body 520, a first imaging lens 502, and a first rectangular image sensor 532. The second optical module 514 has a second mounting body 522, a second imaging lens 504, and a second rectangular image sensor 534. Further, the imaging sensors 532, 534 of the first and second optical modules 512, 514 can be aligned in a horizontal direction (see, e.g., imaging sensors 32, 34 in FIG. 6), and in other applications either of the imaging sensors 532, 534 can be aligned vertically (see e.g., imaging sensors 32, 34 in FIG. 7). In different embodiments, due to the rotational adaptability of the modules 512, 514, the long axes of the image sensors 532, 534 can be aligned in parallel and non-collinear (see, e.g., FIG. 6), in parallel and co-linear (see e.g., FIG. 7), perpendicular to each other (e.g., combining the orientation of the sensor 32 in FIG. 6 and the orientation of the sensor 34 in FIG. 7), or otherwise.

In some aspects, however, the machine vision system 500 differs from the machine vision systems 10, 100, 200, 300, 400. For example, the mounting orientation of the first optical module 512 can be translated laterally (i.e., shifted) relative to the imaging sensor 532 to provide a plurality of mounting orientations and the second optical module 514 can be translated laterally (i.e., shifted) relative to the imaging sensor 534 to also provide a plurality of mounting orientations. For example, as shown in FIG. 14, a first optical axis 506 of the first imaging lens 502 is aligned with a center 536 of the first imaging sensor 532 and a second optical axis 508 of the second imaging lens 504 is aligned with a center 538 of the second imaging sensor 534. Further, the first optical axis 506 is parallel to the second optical axis 508. In this configuration, the first and second optical axes 506, 508 will be centered within the FOV of the first and second imaging sensors 532, 534.

In another example configuration, shown in FIG. 15, the first imaging lens 502 is translated laterally outward relative to the first imaging sensor 532 (i.e., away from the second imaging lens 504), whereby the first optical axis 506 of the first imaging lens 502 is laterally offset a first distance 510 from the center 536 of the first imaging sensor 532. In particular, the lens 502 is translated along a direction defined by an optical element axis 530, which extends along a shortest path between the optical axes 506, 508, within a common plane of the optical axes 506, 508. It is also contemplated that, via other adjustments of the first optical module 512, the first optical axis 506 can be laterally offset from the center 536 of the first imaging sensor 532 by a plurality of different distances (e.g., along the optical element axis 530) or different directions. Similarly, although the center 536 of the first imaging sensor 532 may generally be disposed along the optical element axis 530—e.g., aligned with, laterally to the outside of, or laterally to the inside of the optical axis 506 along the direction of the axis 530—in some embodiments other alignments are possible, including so that a lateral aspect of an offset of the optical axis 506 from the center 536 of the first imaging sensor 532 is one of multiple spatial components of the offset.

Still referring to the example configuration of FIG. 15, the second imaging lens 504 is shown translated laterally outward relative to the second imaging sensor 534 (i.e., away from the first imaging lens 502), whereby the second optical axis 508 of the second imaging lens 504 is laterally offset a second distance 564 from the center 538 of the second imaging sensor 534. In particular, as similarly noted above, the lens 504 is translated along a direction defined by the optical element axis 530, within the common plane of the optical axes 506, 508. It is also contemplated that, via other adjustments of the second optical module 514, the second optical axis 508 can be laterally offset from the center 538 of the second imaging sensor 534 by a plurality of different distances e.g., along the optical element axis 530) or directions. Similarly, although the center 538 of the second imaging sensor 534 may generally be disposed along the optical element axis 530—e.g., aligned with, laterally to the outside of, or laterally to the inside of the optical axis 508 along the direction of the axis 530—in some embodiments other alignments are possible, including so that a lateral aspect of an offset of the optical axis 508 from the center 538 of the second imaging sensor 534 is one of multiple spatial components of the offset.

It is also contemplated that in some imaging configurations, the first distance 510 can be equal to the second distance 564 and in some imaging configurations the first distance 510 can be unequal to (e.g., larger or smaller than) the second distance 564. Further, in some embodiments, the optical modules 512, 514 and the faceplate 516 can be configured so that translation of the modules 512, 514 maintains the first and second optical axes 506, 508 in parallel with each other in a plurality of imaging configurations.

Generally, in some configurations in which an optical axis of a lens is shifted out of alignment with the center of an associated imaging sensor, the FOV provided by the lens may extend past an edge of the imaging sensor. As a result, some translations of an optical module may result in a size of a FOV being altered, as detected by a sensor, and the optical axis may be off-center within the resulting effective FOV (as also discussed relative to FIGS. 17 and 19). For example, as shown in FIG. 15, a FOV 506a of the optical module 512 can extend past a laterally outer edge of the imaging sensor 532, such that an effective FOV for imaging with the optical module 512 may be smaller than the total possible FOV for the imaging lens 502. Similar configurations can also obtain for the optical module 514, and in some cases a FOV for an imaging module may extend past other (e.g., laterally inner) edges of associated imaging sensors.

Additionally, or alternatively, some embodiments of a modular vision system can provide an imaging sensor that is translatable relative to a housing and an optical axis of an imaging lens. In this regard, some optical modules can allow an imaging sensor to be translated laterally relative to a faceplate while an associated imaging lens remains fixed (or is differently reoriented) relative to a faceplate. For example, in some embodiments, an imaging sensor can be mounted to a movable sensor bracket at the back of an optical module. Generally, effective FOV may be affected similarly by a lateral shift of an imaging lens relative to an imaging sensor as by a corresponding lateral shift of an imaging sensor relative to an imaging lens. As such, discussion herein of translation of an imaging lens (or larger optical module) relative to an imaging sensor should be understood to inherently include discussion of a similar adjustment of an imaging sensor (or larger optical module) relative to an imaging lens. Correspondingly, for example, those of skill in the art will recognize that offset spatial relationships between optical axes and image sensors, including as shown in FIG. 15 and other figures, can be achieved by adjusting (e.g., translating) an optical axis, by adjusting (e.g., translating) a sensor, or by adjusting the optical axis and the sensor.

In some embodiments, adjustment of optical axes as generally discussed above can be effected while maintaining a normal orientation between any given optical axis and the associated imaging sensor. For example, in the case of lateral shifting of a lens (or an associated sensor), a focus plane for the lens can generally be maintained in parallel with a sensor plane of the associated sensor. Similarly, as also discussed above, in the case of angular adjustment of a lens, an associated sensor can also generally be similarly adjusted, so that a focus plane for the lens can generally be maintained in parallel with a sensor plane of the associated sensor. However, in some embodiments, other approaches are possible.

FIGS. 10-15 thus generally present example configurations of modular vision systems for which a relative orientation of an optical axis of each of a plurality of optical modules can be selectively adjusted in order to provide a variety of overall imaging configurations. As generally discussed above, embodiments of the technology can thus allow for relatively easy configuration of machine vision systems with multiple optical axes for imaging that are arranged in parallel with, diverging from, or converging toward each other, or with a variety of lateral spacings therebetween (and a variety of lateral spacings relative to the centers of the associated imaging sensors). As further discussed below, this general arrangement can beneficially allow for a high degree of adaptability of machine vision systems for a variety of imaging contexts, including to provide optimized, customizable degrees of overlap of FOVs for multiple image sensors, to provide optimized, customizable total imaging width as provided by multiple FOVs. For example, some systems can be adjustable to provide a constant size of an overlap area for adjacent FOVs, to maximize a total lateral imaging area of a total (collective) imaging FOV while ensuring appropriate overlap at relevant working distances for reliable acquisition of images of symbols or other features (e.g., to provide an overlap size that corresponds to a smallest barcode or other feature to be analyzed), or for a variety of other benefits.

Figure 17:
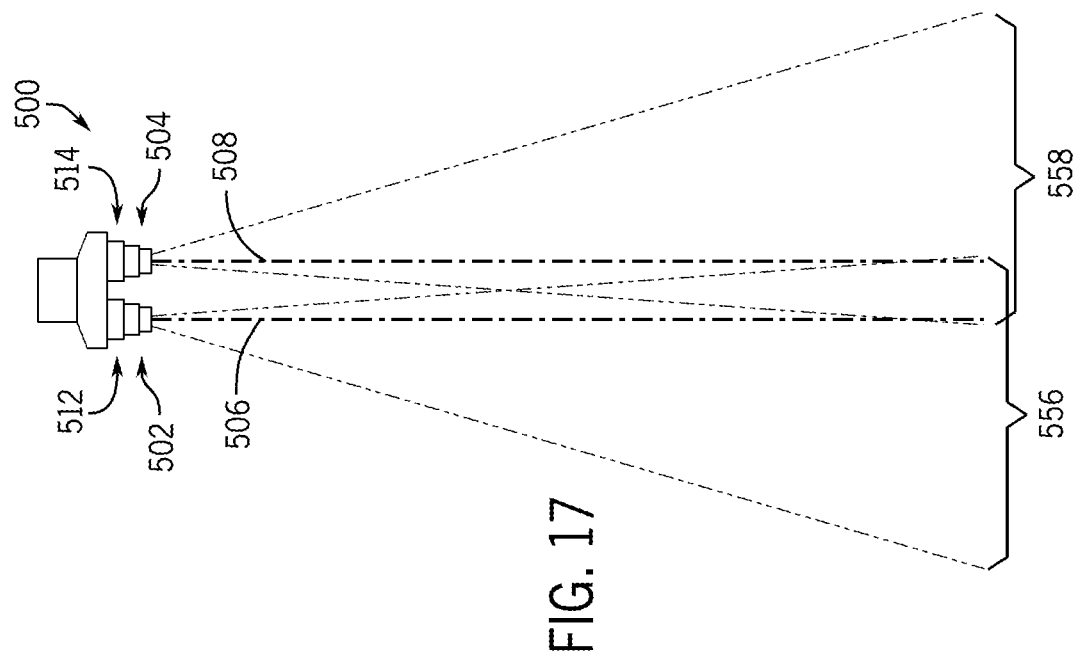
FIG. 17 is a schematic view of a machine vision system with a lens-image sensor shift and parallel optical axes in accordance with some embodiments of the technology.
Figure 16:
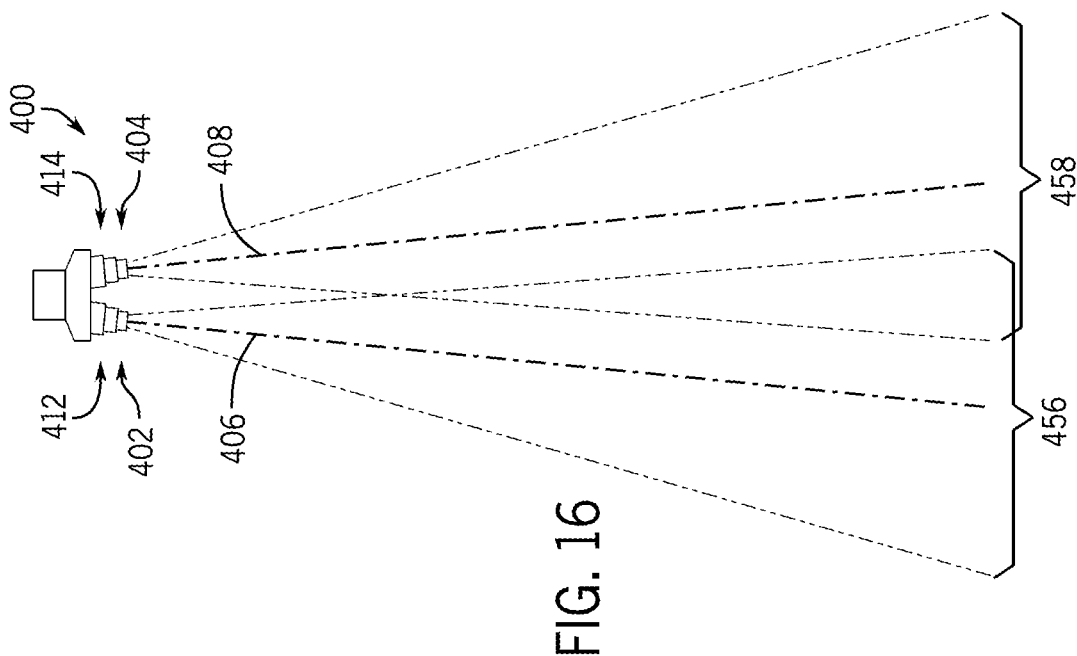
FIG. 16 is a schematic view of a machine vision system with diverging optical axes and fields of view in accordance with some embodiments of the technology.

In this regard, FIGS. 16 and 17 illustrate example imaging configurations of the modular vision systems 400, 500 in which the optical modules 412, 414, 512, 514 have been adjusted to effectively provide diverging FOVs. Generally, diverging configurations (e.g., as shown in FIGS. 16 and 17) can result in a relatively large working (imaging) distance at which FOVs of separate modules overlap, but the degree of overlap between the FOVs tend to increase (e.g., linearly) at increasing distances. Thus, these configurations can be useful, for example, for applications in which FOV overlap may not be required at close working distances, but a relatively large degree of FOV overlap at extended working distances may be important (e.g., for logistics systems). Moreover, configurations with diverging optical axes can require relatively smaller angular or shifting adjustments to optical modules than comparable configurations with converging optical axes. This may result in simpler manufacturing, as well as improved resolution of images at large distances (in the angled configuration) due to the generally smaller deviation of the optical axes from perpendicular and the generally smaller corresponding deviation of focus plane from a normal reference plane.

In FIG. 16, the modular vision system 400 is shown, and the first and second imaging lenses 402, 404 of the first and second optical modules 412, 414 are angled away from each other so that the first and second optical axes 406, 408, and thereby FOVs 456, 458, diverge from each other. The working distance from the modular vision system 400 at which the FOVs 456, 458 start to overlap is dependent on the angles of orientation of the first and second imaging lenses 402, 404, respectively, relative to the reference line 498, and can thus be adjusted as desired for any particular context. Further, because the directions of the optical axes 406, 408 diverge from each other, a relatively wide total (collective) coverage of the FOVs 456, 458 may be obtained.

In FIG. 17, the modular vision system 500 is shown, with the first and second imaging lenses 502, 504 shifted away from each other and with the first and second optical axes 506, 508 spaced a distance from the respective centers of the first and second imaging sensors (hidden). The first and second optical axes 506, 508 remain in parallel with each other. However, due to the associated FOVs of the lenses 502, 504 extending laterally beyond the associated sensors (as also discussed relative to FIG. 15), effective FOVs 556, 558 for image acquisition diverge from each other. In other words, because the optical axes 506, 508 are shifted sufficiently laterally outward relative to the associated imaging sensors, the FOVs 556, 558 are not symmetrical relative to the optical axes 506, 508 and, in particular, are effectively truncated on the laterally interior side thereof.

As similarly discussed relative to FIG. 16, the working distance from the modular vision system 500 at which the FOVs 556, 558 start to overlap is dependent on the distance the first and second imaging lenses 502, 504, respectively, are spaced apart. Further, as with the configuration illustrated in FIG. 16, the overlap between the FOVs 556, 558 increases with working distance beyond the initial intersection of the FOVs 556, 558. Thus, in some cases, a particular lateral spacing of the lenses 502, 504 can be selected in order to provide an optimized balance between a desired working distance for a particular overlap and a desired total coverage of the FOVs 556, 558 at a conveyor (or other location).

Figure 19:
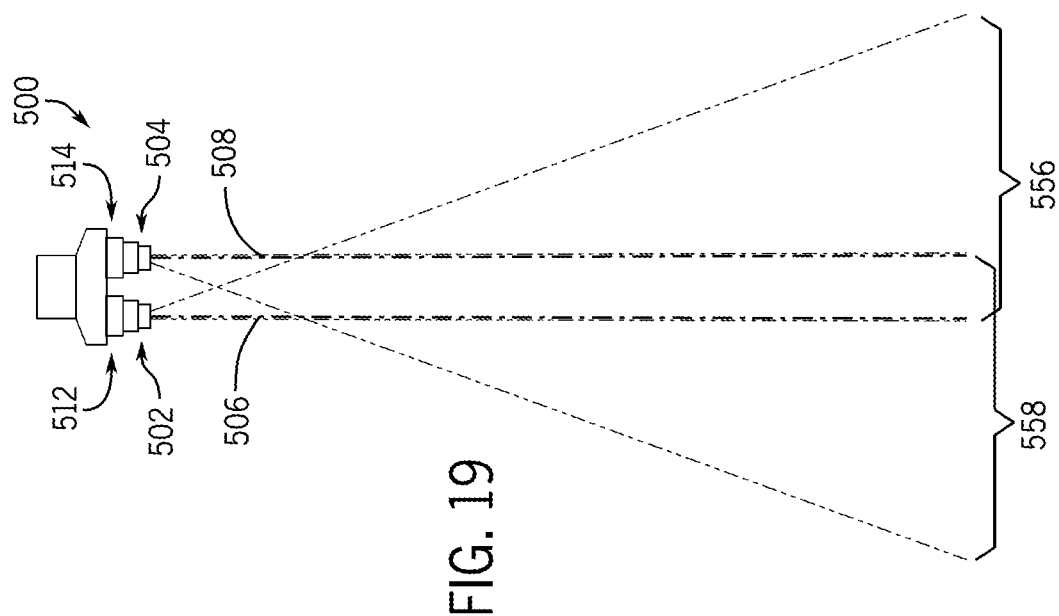
FIG. 19 is a schematic view of a machine vision system with a lens-image sensor shift and parallel optical axes in accordance with some embodiments of the technology.
Figure 18:
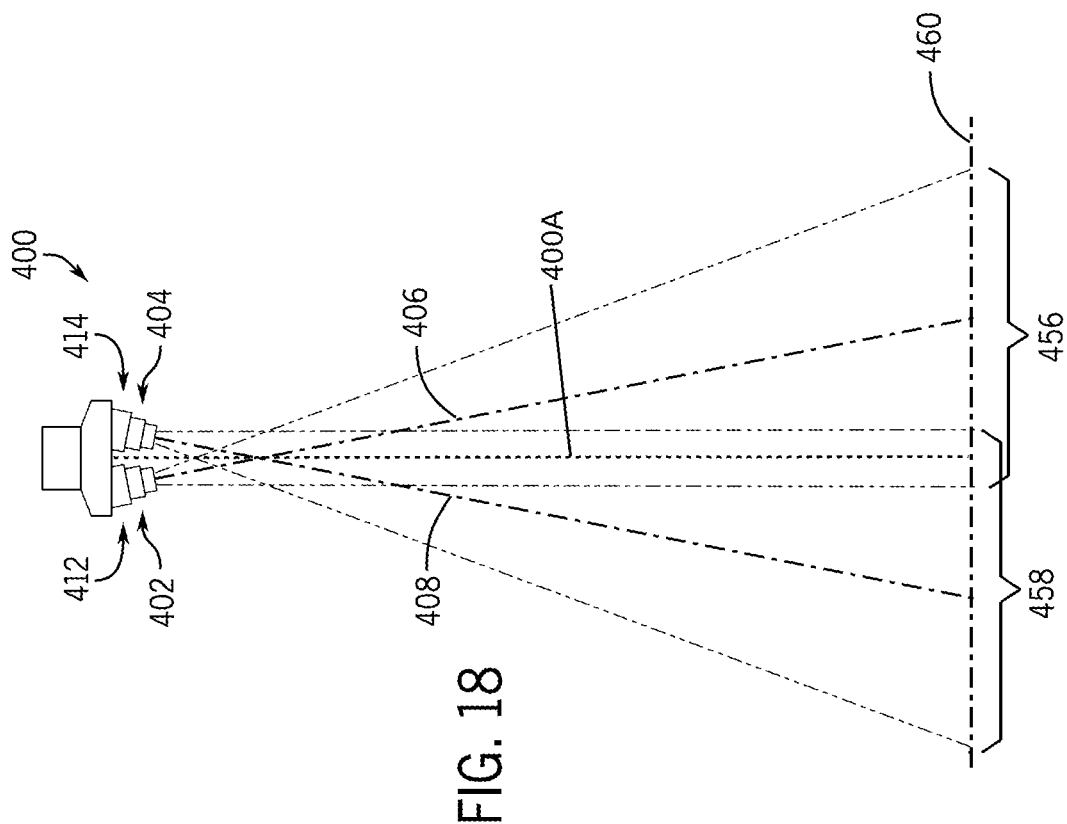
FIG. 18 is a schematic view of a machine vision system with overlapping optical axes and fields of view.

FIGS. 18 and 19 illustrate examples of modular vision systems 400, 500 in which the optical modules 412, 414, 512, 514 have been adjusted to effectively provide converging FOVs. Generally, converging configurations (e.g., as shown in FIGS. 18 and 19) can result in a relatively small working (imaging) distance at which FOVs of separate modules overlap, so that effective image acquisition can be conducted over a relatively large range of working distances. Further, in some cases, a converging configuration can result in constant overlap of FOVs (i.e., an overlap with a constant width within a common plane (e.g., as includes both of the relevant optical axes)) over an extended range of working distances. Thus, these configurations can be useful, for example, for applications in which relatively small working distances may be required.

In FIG. 18, the modular vision system 400 is shown with the first and second imaging lenses 402, 404 angled toward each to result in the first and second optical axes 406, 408, and thereby the FOVs 456, 458, also being angled toward each other. As a result, the FOVs 456, 458 initially overlap at a relatively short working distance, such as may support acquisition of useful images of symbols (or other features) that are relatively close to the vision system 400.

In particular, in the illustrated configuration, the laterally outer side of the first FOV 456 (i.e., the side that is farthest from the second optical module 414) extends in parallel with the laterally outer side of the second FOV 458 (i.e., the side that is farthest from the first optical module 412). In some cases, including as shown, one or more of these sides of the FOVs 456, 458 can also extend in parallel with an imaging direction 400A. Further, the laterally outer sides of the FOVs 456, 458 can be perpendicular to an object plane 460, including as shown in FIG. 18. As a result, beyond an initial working distance, the width of the overlap between the FOVs 456, 458 remains constant regardless of working distance. Of note, the angle of the first and second imaging lenses 402, 404 that is shown in FIG. 18 can be considered a maximum converging angle for some installations, because it results in the outer edges of the FOVs 456, 458 being parallel. Thus, any increase in angle would cause the outer edges of the FOVs 456, 458 to eventually cross, with a resulting non-overlapped area (i.e., a blind spot) at the object plane 460. In some embodiments, a smaller converging angle can be provided, although this may not provide a constant-width overlap between the resulting FOVs (in contrast to the illustrated configuration).

In general, an imaging direction is defined as at least one of: a direction corresponding to a straight-line minimum distance between a target area for imaging (e.g., the object plane 460) and a point on a faceplate (e.g., the faceplate 416) that is halfway between the first and second imaging lenses (e.g., the lenses 402, 404); or a direction corresponding to a line that bisects an angle between two optical axes (e.g., the axes 406, 408) of an imaging system. An object plane (e.g., the object plane 460) is defined as a plane at the working distance from the modular vision system 400 within which the focus planes of the first and second lenses 402, 404 overlap.

In FIG. 19, the modular vision system 500 is shown with the first and second imaging lenses 502, 504 shifted toward each other and with the first and second optical axes 506, 508 spaced a distance from the centers of the first and second imaging sensors (hidden), respectively. In particular, the first and second optical axes 506, 508 remain in parallel with each other. However, due to the associated FOVs of the lenses 502, 504 extending laterally beyond the associated sensors (as also discussed relative to FIG. 15), effective FOVs 556, 558 for image acquisition converge toward each other. In other words, because the optical axes 506, 508 are shifted sufficiently laterally inwardly relative to the associated imaging sensors, the FOVs 556, 558 are not symmetrical relative to the optical axes 506, 508. Indeed, in the illustrated configuration, the optical axes 506, 508 exactly intersect respective edges of the imaging sensors and thus define the laterally outer edges of the respective FOVs 556, 558, so that the outer edges of the FOVs 556, 558 are thus also in parallel. Correspondingly, as shown in FIG. 19, beyond an initial working distance, the width of the overlap between the FOVs 556, 558 remains constant regardless of working distance.

Similar other configurations in which optical axes intersect an edge of an imaging sensor may be advantageous in other embodiments and contexts. As used herein, an optical axis or other optical reference is considered to intersect an edge of an imaging sensor if the optical axis or other optical reference impinges on the optical sensor (or extends past the sensor) at a distance from the edge of the sensor that is within 5% of the total pixel width of the sensor. In some cases, an optical axis may impinge on the final row or column of pixel detectors of an imaging sensor and can accordingly be considered as exactly intersecting the edge of the imaging sensor. As generally discussed above, however, some embodiments can include an optical axis that intersect an imaging sensor at other locations, including at locations that are centered on the imaging sensor, and at locations that are not centered on the imaging sensor but also not so far off-center as to intersect the sensor edge (e.g., as may or may not result in part of the FOV associated with the optical axis being truncated by one or more edges of the sensor).

FIGS. 16 and 18 are illustrated with the modular vision system 400. However, it should be noted that the same discussion applies to the modular vision system 300 with the use of wedges to alter the angle of the optical axes. Similarly, other modular visions systems that provide angular or shifting (translational) adjustment of optical axes can be similarly configured to provide converging or diverging FOVs, including as generally shown in the example configurations of FIGS. 16 through 19. Further, although only angular adjustments or only lateral adjustments are discussed with respect to any given configuration of FIGS. 16 through 19, some embodiments can include modules that are configured to angular and shifting adjustments.

In some configurations, use of translational (shifting) adjustments can be particularly suitable to embodiments that employ variable focal length (i.e., zoom) lenses. When used in conjunction with a variable focal length imaging lenses, for example, laterally shiftable optical modules, with maintained parallel alignment of optical axes, can provide an overlap of constant width between the FOVs within the common imaging plane of the first and second imaging sensors at any variety of focal lengths, thereby allowing the modular vision system to scale perpendicularly to the sensor plane.

Figure 20:
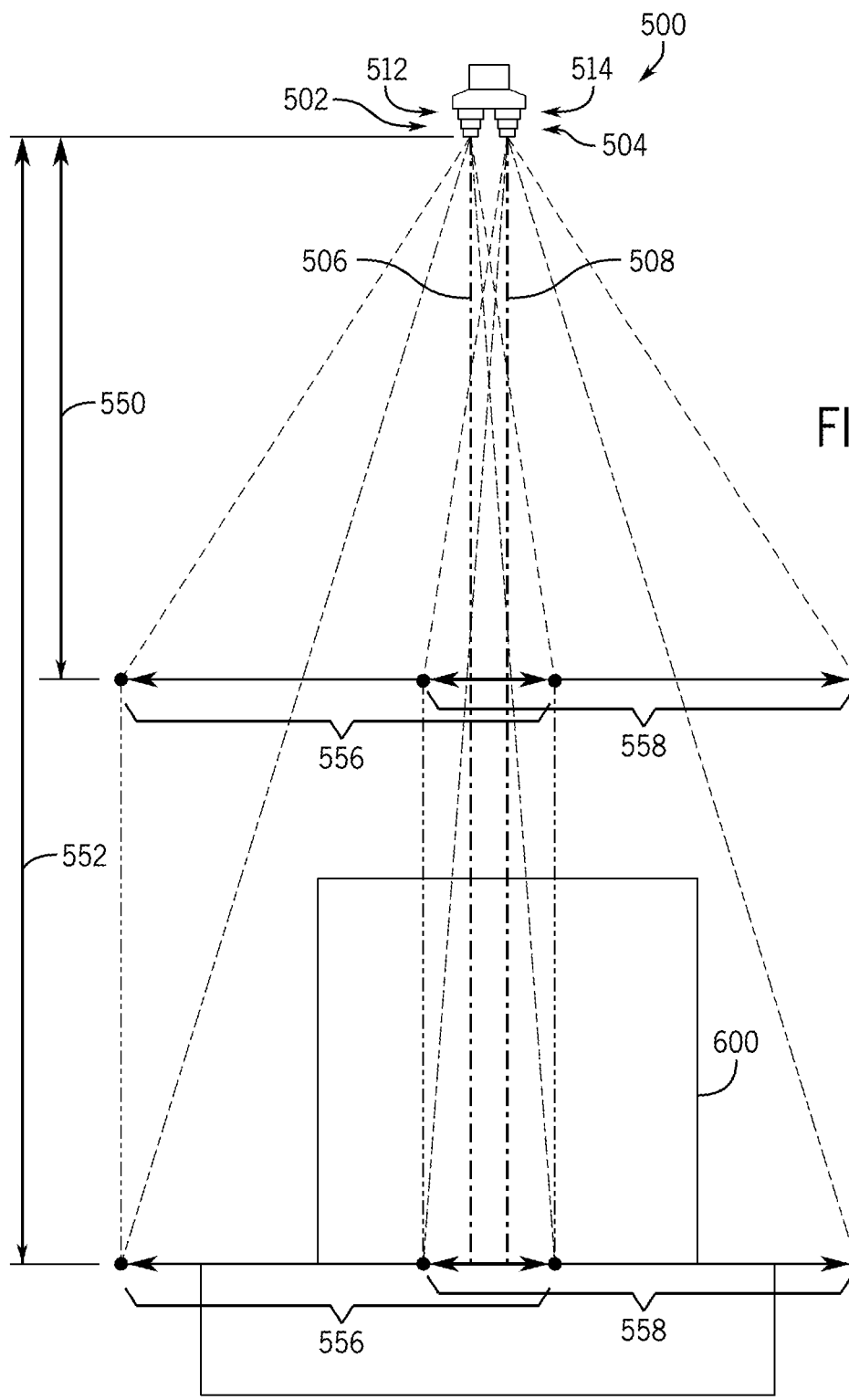
FIG. 20 is a schematic view of a machine vision system with a lens-image sensor shift and illustrating constant overlap of the fields of view at different focal distances.

For example, the modular vision system 500 is shown in FIG. 20 with the first and second imaging lenses 502, 504 configured as zoom lenses and with the optical modules 512, 514 laterally shifted away from each other and the first and second optical axes 506, 508 are spaced a distance from the respective centers of the first and second imaging sensors (hidden). Thus, the FOVs 556, 558 in FIG. 20 are similarly configured as shown in FIG. 17, although the particular lateral adjustment between the two configurations may be varied as appropriate for any give context. However, the first and second variable focal length lenses 502, 504 can be adjusted to have a first common focal length 550 wherein the FOVs 556, 558 define an overlap of a particular width within a common plane. Further, the first and second variable focal length lenses 502, 504 can be adjusted to have a second common focal length 552 that is greater than the first common focal length 550, and at which the FOVs 556, 558 still define an overlap of constant width within the common plane. Further, a similar effect may also result with other zoom adjustments, with the modular vision system 500, in this imaging configuration, providing an overlap of the FOVs having a constant width at a plurality of common focal lengths. Thus, for example, useful images can be acquired an object 600 of a wide variety of heights, with the constant overlap of FOVs, as defined by the selective adjustment of the optical modular, ensuring that symbols or other features of interest can be fully captured within any given one of the FOVs.

In some implementations, devices or systems disclosed herein can be utilized or installed using methods embodying aspects of the technology. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the technology, of the utilized features and implemented capabilities of such device or system.

Referring again to FIG. 1, for example, in some embodiments of the technology a method of installing a set of optical modules in a machine vision device is provided. In one embodiment, the first optical module 12 is positioned in a predetermined orientation relative to the housing axis 84 and is received within one of the first or second mounting apertures 44, 46 in the faceplate 16. The second optical module 14 is positioned in a predetermined orientation relative to the housing axis 84 and is received within the other of the first or second mounting apertures 44, 46. The first and second optical modules 12, 14 can also be secured to the faceplate 16. An electrical connection can be made between at least one of the first optical module 12 or the second optical module 14 to the computing device 88 of the machine vision system 10 for electrical communication therebetween. In some embodiments, the faceplate 16 is positioned in a predetermined orientation relative to the housing axis 84 and is secured thereto. An electrical connection can be made between the faceplate 16 and the computing device 88 of the machine vision system 10 for electrical communication therebetween. It should be understood that this method could include other embodiments of the machine vision device including modular vision systems 300, 400, and 500.

Referring also back to FIG. 11, for example, in some embodiments of the technology a method of installing a set of optical modules in a machine vision device is provided. In one embodiment, a first optical module 312 with a first wedge 348 providing a mounting orientation (as selected from a plurality of mounting orientations) is selected and positioned in a predetermined orientation relative to the faceplate 316. The second optical module 314 with a second wedge 350 providing a mounting orientation (as selected from a plurality of mounting orientations) is selected and positioned in a predetermined orientation relative to the faceplate 316. Thus, through selection of particular wedges, a particular relative angular orientation of optical axes of two optical modules can be selected, and performance for a particular application can be optimized (e.g., under considerations discussed above). It should be also understood that this (or other similar) method could include other embodiments of the machine vision device including embodiments 400 and 500, including in cases for which angular adjustments are effected via adjustment relative to a cylindrical mounting feature, and in cases for which a lateral adjustment of an optical module (or component thereof) is selected instead of (or in addition to) an angular adjustment.

Referring again to FIGS. 12 and 13, for example, in some embodiments of the technology a method of installing a set of optical modules in a machine vision device is provided. In one embodiment, the first optical module 412 is positioned in a predetermined orientation relative to the faceplate 416, and a mounting orientation for the first imaging lens 402 is selected from a plurality of mounting orientations to provide a corresponding one of a plurality of imaging configurations. The second optical module 414 is positioned in a predetermined orientation relative to the faceplate 416 and a mounting orientation for the second imaging lens 404 is selected from a plurality of mounting orientations to provide a corresponding one of a plurality of imaging configurations. It should be understood that this method could include other embodiments of the machine vision device including modular vision systems 300 and 500, including in cases for which angular adjustments are effected via selection of a particular wedge (or set of wedges), and in cases for which a lateral adjustment of an optical module (or component thereof) is selected instead of (or in addition to) an angular adjustment.

The particular embodiments disclosed above are illustrative only, as the technology may be modified and practiced in different but equivalent manners apparent to those skilled in the art having the benefit of the teachings herein. Further, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A modular vision system comprising:
   a housing with a faceplate;
   a first optical module that is mounted to the faceplate and includes a first mounting body, a first rectangular image sensor, and a first imaging lens that defines a first optical axis and a first field of view (FOV); and
   a second optical module that is mounted to the faceplate and includes a second mounting body, a second rectangular image sensor, and a second imaging lens that defines a second optical axis and a second field of view (FOV);

the first optical module being configured to be mounted to the faceplate in a first plurality of mounting orientations and the second optical module being configured to be mounted to the faceplate in a second plurality of mounting orientations, to collectively provide a plurality of imaging configurations in which the first and second optical axes extend obliquely relative to each other within a common plane.

2. The modular vision system of claim 1, wherein each of two or more of the imaging configurations corresponds to a respective different angle defined between the first and second optical axes.

3. The modular vision system of claim 1, wherein a first direction in which the first optical axis extends from the first optical module diverges from a second direction in which the second optical axis extends from the second optical module, in two or more of the imaging configurations.

4. The modular vision system of claim 3, wherein an angle defined between the first and second optical axes is between 5° and 30°, inclusive, in the two or more of the imaging configurations.

5. The modular vision system of claim 1, further comprising:
a first interchangeable wedge configured to provide a subset of the first plurality of mounting orientations; and
a second interchangeable wedge configured to provide a subset of the second plurality of mounting orientations.

6. The modular vision system of claim 1, further comprising:
a first cylindrical mounting surface configured to support the first optical module relative to the housing in the first plurality of mounting orientations; and
a second cylindrical mounting surface configured to support the second optical module relative to the housing in the second plurality of mounting orientations.

7. The modular vision system of claim 1, wherein, in at least one of the imaging configurations, the first optical axis extends from the first optical module towards the second optical axis and the second optical axis extends from the second optical module towards the first optical axis.

8. The modular vision system of claim 7, wherein, in the at least one of the imaging configurations, the first and second optical axes are aligned relative to each other to provide an overlap of constant width between the first and second FOVs within the common plane.

9. The modular vision system of claim 8, wherein, in the at least one of the imaging configurations, a side of the first FOV that is farthest from the second optical module and a side of the second FOV that is farthest from the first optical module extend in parallel with an imaging direction.

10. A modular vision system comprising:
a housing with a faceplate;
a first optical module that is mounted to the faceplate and includes a first mounting body, a first rectangular image sensor, and a first imaging lens that defines a first optical axis and a first field of view (FOV); and
a second optical module that is mounted to the faceplate and includes a second mounting body, a second rectangular image sensor, and a second imaging lens that defines a second optical axis and a second field of view (FOV), the second optical axis being in a common plane with the first optical axis, and an optical element axis defining a direction that extends along the common plane between the first and second optical axes;
the first optical module being configured to be mounted to the faceplate in a first plurality of mounting orientations and the second optical module being configured to be mounted to the faceplate in a second plurality of mounting orientations, to collectively provide a plurality of imaging configurations in which the first optical axis is laterally offset relative to a center of the first rectangular image sensor, in the direction of the optical element axis, by a plurality of different distances, and the second optical axis is laterally offset from the a center of the second rectangular imaging sensor, in the direction of the optical element axis, by a plurality of different distances.

11. The modular vision system of claim 10, wherein each of two or more of the imaging configurations correspond to a respective different set of the offsets of the first and second optical axes from the centers of the first and second rectangular image sensors.

12. The modular vision system of claim 10, wherein the first and second optical axes are parallel with each other in the plurality of imaging configurations.

13. The modular vision system of claim 12, wherein, in at least one of the imaging configurations, the offsets of the first and second optical axes provide an overlap of constant width between the first and second FOVs within a common plane.

14. The modular vision system of claim 13, wherein, in the at least one of the imaging configurations, the offset of the first optical axis is an outward offset that aligns the first optical axis to intersect an outer edge of the first rectangular image sensor and the offset of the second optical axis is an outward offset that aligns the second optical axis to intersect an outer edge of the second rectangular image sensor.

15. The modular vision system of claim 12, wherein the first imaging lens is a first variable focal length lens and the second imaging lens is a second variable focal length lens; and
wherein, in the at least one of the imaging configurations, adjustment of the first and second imaging lenses to any of a plurality of common focal lengths provides an overlap of constant width between the first and second FOVs, within a common plane, at working distances corresponding to the common focal lengths.

16. A modular vision system comprising:
a housing with a faceplate;
a first optical module that is mounted to the faceplate and includes a first mounting body, a first rectangular image sensor, and a first imaging lens that defines a first optical axis and a first field of view (FOV); and
a second optical module that is mounted to the faceplate and includes a second mounting body, a second rectangular image sensor, and a second imaging lens that defines a second optical axis and a second field of view (FOV);
the first optical module being configured to be mounted to the faceplate in a first plurality of mounting orientations and the second optical module being configured to be mounted to the faceplate in a second plurality of mounting orientations, to selectively place the modular vision system in a plurality of imaging configurations that provide a plurality of distinct configurations of the first and second optical axes;
wherein:
in each of two or more of the mounting orientations, the first and second optical axes angle away from each other within a common plane;
in each of two or more of the mounting orientations, the first and second optical axes angle towards each other and provide an overlap of constant width between the first and second FOVs within a common plane; or in a first and a second of the mounting orientations, the first optical axis extends in parallel with the second optical axis, within the common plane;
  wherein the first mounting orientation provides a first offset configuration of the first and second optical axes relative to the corresponding first or second image sensor; and
  wherein the second mounting orientation provides a second, different offset configuration of the first and second optical axes relative to the corresponding first or second image sensor.

17. The modular vision system of claim 16, wherein, with the first and second modules in the first or second mounting configuration in which the first optical axis extends in parallel with the second optical axis, the first imaging lens is a first variable focal length lens and the second imaging lens is a second variable focal length lens; and
  wherein, in the first imaging configuration, adjustment of the first and second imaging lenses to any of a plurality of first common focal lengths provides an overlap of a first constant width between the first and second FOVs, within the common plane, at the focus distances corresponding to the second common focal lengths; and
  wherein, in the second imaging configuration, adjustment of the first and second imaging lenses to any of a plurality of second common focal lengths provides an overlap of a second constant width between the first and second FOVs, within the common plane, at the focus distances corresponding to the second common focal lengths.

* * * * *

UNITED STATES PATENT AND TRADEMARK OFFICE
CERTIFICATE OF CORRECTION

PATENT NO. : 11,665,410 B2
APPLICATION NO. : 17/195396
DATED : May 30, 2023
INVENTOR(S) : Saul Sanz Rodriguez et al.

It is certified that error appears in the above-identified patent and that said Letters Patent is hereby corrected as shown below:

In the Specification

Column 11, Line 40, "(CO)" should be --$(C_n)$--.

Signed and Sealed this
Fourth Day of July, 2023

Katherine Kelly Vidal
*Director of the United States Patent and Trademark Office*